(12) United States Patent
Boreham et al.

(10) Patent No.: US 7,020,662 B2
(45) Date of Patent: Mar. 28, 2006

(54) METHOD AND SYSTEM FOR DETERMINING A DIRECTORY ENTRY'S CLASS OF SERVICE BASED ON THE VALUE OF A SPECIFIER IN THE ENTRY

(75) Inventors: David Boreham, Livingston, MT (US); Peter Rowley, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 388 days.

(21) Appl. No.: 09/867,595

(22) Filed: May 29, 2001

(65) Prior Publication Data

US 2003/0078995 A1    Apr. 24, 2003

(51) Int. Cl.
G06F 7/00 (2006.01)
G06F 17/00 (2006.01)
G06F 17/30 (2006.01)
G06F 15/177 (2006.01)

(52) U.S. Cl. ............... 707/104.1; 707/101; 707/100; 707/3; 709/220

(58) Field of Classification Search ............... 709/203, 709/220; 707/104.1, 3, 101, 100
See application file for complete search history.

(56) References Cited

U.S. PATENT DOCUMENTS

| | | | |
|---|---|---|---|
| 5,774,552 A | 6/1998 | Grimmer | 380/25 |
| 5,878,421 A * | 3/1999 | Ferrel et al. | 707/100 |
| 6,101,541 A | 8/2000 | Ellesson et al. | 709/225 |
| 6,157,942 A | 12/2000 | Chu et al. | 709/203 |
| 6,173,283 B1 | 1/2001 | Kasso et al. | 707/10 |
| 6,339,775 B1 * | 1/2002 | Zamanian et al. | 707/101 |
| 6,868,525 B1 * | 3/2005 | Szabo | 715/738 |
| 2004/0132433 A1 * | 7/2004 | Stern et al. | 455/414.1 |

OTHER PUBLICATIONS

Oracle7 Administrator's Guide, Release 7.3, Feb. 1996, Oracleâ.*
iPlanet Directory Server Adminstrator's Guide, Version 5.0, Sun Microsystems, Inc. Doc. ID 816-0799-01, Apr., 2001.*
iPlanet Directory Server Administrator's Guide, Version 5.0, Sun Microsystems, Inc. Doc. ID 816-0799-01, Apr., 2001.*
Netscape Directory Server Version 4.1, Deployment Guide, Chapter 4, Planning Directory Schema, "Directory Data Representation Overview", 5 pages, undated.
Netscape Directory Server Version 4.1, Gateway Customization Guide, Chapter 5, "Entry Types and Object Class Attributes", 12 pages, undated.
Netscape Directory Server Version 4.1, Gateway Customization Guide, Chapter 6, "Search Attributes, Filters, and Results", 14 pages, undated.
Netscape Directory Server Version 4.1, Administrator's Guide, Chapter 9, "Managing Directory Entries", 34 pages, undated.

* cited by examiner

Primary Examiner—Mohammad Ali
Assistant Examiner—Kuen S. Lu
(74) Attorney, Agent, or Firm—Osha Liang LLP

(57) ABSTRACT

Class of Service (CoS) is a mechanism that allows a user to share attributes between directory entries in a way transparent to an application. A CoS scheme includes a CoS Definition entry and a CoS Template entry. These two entries interact to provide attribute values to target entries within their CoS "scope". In Classic CoS, an attribute-value pair is matched with a target entry based on the target entry's DN. The CoS Definition entry, which is stored as an LDAP subentry below the branch at which it is effective, identifies the type of CoS being used. The Template entry contains a list of attribute values that are shared. Any change made to the template entry's attribute values is automatically applied to all entries that share the attribute.

18 Claims, 24 Drawing Sheets

```
dn: cn=peonrole, dc=dom, dc=ain
objectclass: top
objectclass: LDAPsubentry
objectclass: nsRole
objectclass: nsComplexRole
objectclass: nsEnumeratedRole
objectclass: groupofuniquenames
cn: peonrole
groupmember: uid=dboreham, ou=people, dc=dom, dc=ain
groupmember: uid=merrells, ou=people, dc=dom dc=ain
groupmember: uid=claire, ou=people, dc=dom, dc=ain
Description: Lowest of the Low Roles within the Company
```

```
dn: cn=managerrole, dc=dom, dc=ain
    objectclass: top
    objectclass: LDAPsubentry
    objectclass: nsRole
    objectclass: nsSimpleRole
    objectclass: nsManagedRole
    cn: managerrole
    description: Manager Role within the Company
```

FIGURE 7 dn: uid=pointyhair, ou=people, dc=dom, dc=ain
    objectclass: top
    objectclass: person
    objectclass: inetorgperson
    uid: pointyhair
    gn: pointyhair
    sn: hair
    nsRoleDN: cn=managerrole, dc=dom, dc=ain
    description: Pointy Haired Manager

FIGURE 8 dn: cn= building12people, dc=dom, dc=ain objectclass: top objectclass: LDAPsubentry objectclass: nsRole objectclass: nsComplexRole objectclass: nsFilteredRole cn: building12people nsRoleFilter: building=12 description: People who work in building 12

FIGURE 9 dn: cn=megamanagerrole, dc=dom, dc=ain objectclass: top objectclass: LDAPsubentry objectclass: nsRole objectclass: nsComplexRole objectclass: nsNestedRole cn: megamanagerrole nsRoleDN: cn=managerrole, dc=dom, dc=ain nsRoleDN: cn=networkmanager, dc=dom, dc=ain description: Super Manager Role within the Company

FIGURE 10

```
dn: cn=peonrole, dc=dom, dc=ain
objectclass: top
objectclass: LDAPsubentry
objectclass: nsRole
objectclass: nsComplexRole
objectclass: nsEnumeratedRole
objectclass: groupofuniquenames
cn: peonrole
groupmember: uid=dboreham, ou=people, dc=dom, dc=ain
groupmember: uid=merrells, ou=people, dc=dom dc=ain
groupmember: uid=claire, ou=people, dc=dom, dc=ain
Description: Lowest of the Low Roles within the Company
```

FIGURE 11

Dn:cn=messaging_server_cos, ou=people, o=acme
    objectclass: top
    objectclass: LDAPSubentry
    objectclass: cosSuperDefinition
    objectclass: cosClassicDefinition
    cosTemplate Dn:cn=MailServerCOS, cn=LocalConfig, o=NetscapeRoot
    cosSpecifier: mailServiceClass
    cosAttribute: mailboxquota
    cosAttribute: maysendexternalmail

FIGURE 18

```
dn: cn=user, cn=MailServerCos, cn=LocalConfig, o=NetscapeRoot
objectclass: top
objectclass: mailserveruser
objectclass: cosTemplate
mailboxquota: 10000000
maysendexternalmail: TRUE
dn: cn=guest, cn=MailServerCos, cn=LocalConfig, o=NetscapeRoot
objectclass: top
objectclass: mailserveruser
objectclass: cosTemplate
mailboxquota: 1000000
maysendexternalmail: FALSE
```

FIGURE 19

```
dn: cn=messaging_server_cos, ou=people, o=acme
objectclass: top
objectclass: LDAPSubentry
objectclass: cosSuperDefinition
objectclass: cosPointerDefinition
cosTemplateDn: ou=people, o=acme
cosAttribute: facsimilieTelephoneNumber default
```

FIGURE 22

```
dn: cn=messaging_server_cos, ou=people, o=acme
objectclass: top
objectclass: LDAPSubentry
objectclass: cosSuperDefinition
objectclass: cosIndirectDefinition
cosIndirectSpecifier: manager
cosAttribute: accountingCode
```

FIGURE 24

METHOD AND SYSTEM FOR DETERMINING A DIRECTORY ENTRY'S CLASS OF SERVICE BASED ON THE VALUE OF A SPECIFIER IN THE ENTRY

TECHNICAL FIELD

The disclosed system and method relate generally to providing directory services in a centralized or distributed computing environment, and more particularly, to a directory service that uses methods of grouping entries.

BACKGROUND

Electronic directories or directory servers are becoming important tools to manage network resources. The term Directory Service refers to a collection of software, hardware, and processes that store information about an enterprise or an organization and make the information available to users. A directory service generally includes at least one instance of Directory Server and one or more directory client programs. Client programs can access names, phone numbers, addresses, and other data stored in the directory. For example, one common directory service is a Domain Name System (DNS) server. A DNS server maps computer host names to Internet Protocol (IP) addresses. Thus, all of the computing resources (hosts) become clients of the DNS server. The mapping of host names allows users of an organization's computing resources to easily locate computers on an organization's network by remembering host names rather than numerical IP addresses. It should be noted, however, that while the DNS server stores only two types of information, namely, names and IP addresses, a true directory service stores virtually unlimited types of information.

A directory server forms a central information repository that provides data warehousing functionality to access users and groupings to which users belong. By thus becoming a central point where network, security and application services are able to obtain information, the directory has emerged as a key component of an integrated distributed computing environment. Additionally, the centralization of information has enabled ease of administering the information. Several uses of directories are known: (1) as naming service e.g., Directory Naming Service for Internet host addresses; (2) as user registry for storing information of all users in a system of interconnected computers; and (3) a Yellow Pages service, which allows E-mail clients to perform look-up to find destination addresses.

A directory service uses a namespace, which provides for efficient referencing and retrieval of collections of related information, such as a person's name, organization, physical address, and e-mail address. Corporate directories have been evolving independent of any standardized protocol to access them. On corporate Local Area Networks (LANs), each e-mail system has its own directory, which is not interoperable with those of other vendors. On larger systems using TCP/IP, there is no single directory standard—certainly not one that is routinely used on the scale of intranets.

Standardized Directory Access Protocols (DAP) such as the X.500—which is the International Telecommunication Union (ITU-T) standard for directories—are designed to provide a uniform method of accessing the directory servers from any application program executing on any computer system. These protocols are designed to overcome the problems of incompatible host systems and access procedures. Referring to FIG. 1, applications and users access a directory service by making a request to a Directory User Agent (DUA), which transfers the request to a Directory System Agent (DSA), using the DAP. The directory itself can include one or more DSAs. The DSAs can either communicate among themselves to share directory information, or can direct the DUA to use a specific DSA. This latter mechanism is called a referral. Referrals can happen when DSAs are not set up to exchange directory information, such as in cases where administrators did not agree on how to interwork with these components, or due to security concerns.

As shown in FIG. 2, in X.500, there are 17 base object classes such as Country, Organization, Organizational Unit, Locality, and Person. These object classes can have one or more of the 40 attribute types such as Country, Organization Name, Organizational Unit Name, Locality Name, and Common Name. FIG. 3 shows a hierarchically arranged instance of X.500 data tree.

X.500 forms the application layer of the well-known 7-layer Open Systems Interconnection (OSI) protocol stack, and requires a large amount of memory and operational overhead. Moreover, X.500 addressing has become quite complex. In X.500, the namespace is explicitly stated and is hierarchical. Such namespaces require relatively complicated management schemes. The naming model defined in X.500 is concerned mainly with the structure of the entries in the namespace, not the way the information is presented to the user.

The complete set of all information held in a Directory is known as the Directory Information Base (DIB). It should be noted that not all of this information is visible to normal users of the Directory. Referring to FIG. 4, in a Directory User Information Model, an entry holds information about an object of interest to users of the Directory. These (Directory) objects might typically be associated with, or be some facet of, real world things such as information processing systems or telecommunications equipment or people. So there can be a Directory entry for an X.400 Message Transfer Agent (MTA), and another one for the manager. However, it is very important to note that Directory objects do not necessarily have a one-to-one correspondence to real world things. This has typically caused a lot of confusion to non-experts, many of whom assume that every entry in the Directory contains all the relevant information about one real world thing. This is not necessarily so. Directory objects, and hence entries, can have a one-to-one correspondence with real world things, or can have a many-to-one or one-to-many relationship with real world things. For example, a Directory object/entry may be a mailing list containing the names of many real people (one-to-many correspondence). Alternatively, a real person may be represented in the Directory as both a residential person object/entry and an organisational person object/entry (many-to-one correspondence). In the latter case, the organisational person Directory entry would hold information that is relevant to describing the person in their working environment, holding their office room number, internal telephone extension number, electronic mail address, and the department etc., the residential person Directory entry would describe the person in their residential capacity, holding their home postal address and home telephone number etc. Objects that have similar characteristics are identified by their object class. Every object entry in the Directory is a member of at least one object class. So, for example, there is an 'organizational person' object class for organizational person entries, and a 'residential person' object class for residential person entries. This organizational person object will be explained in detail below.

Also shown in FIG. 4 are entries. Every entry in an X.500 Directory Information Tree (DIT) is a collection of attributes, each attribute composed of a type element and one or more value elements. Because it was designed to accommodate all types of directories, in case of the X.500, the DAP has become too general to be easily configured to work with specialized applications. These reasons have resulted in a limited user acceptance of X.500. Each piece of information that describes some aspect of an entry is called an attribute. An attribute comprises an attribute type and one or more attribute values. An example of an attribute type might be 'telephone number' and an example of a telephone number attribute value might be '+91 861 324 251'.

The Lightweight Directory Access Protocol (LDAP) has emerged as an open standard from the Internet Engineering Task Force (IETF) to provide directory services to applications ranging from e-mail systems to distributed system management tools. LDAP was created as a protocol for accessing X.500 directories so that clients could run on desktop computers without affecting performance. LDAP is based on a client-server model in which a client makes a TCP/IP connection to a Directory server, sends requests, and receives responses. The LDAP information model, in particular, is based on the concept of a "target entry", which contains information about some object. In this application, an unqualified reference to an "entry" means that a reference is made to a "target entry."

Entries are typically organized in a specified tree structure, and each entry is composed of attributes. In an LDAP-compliant directory server, each user and group in an organization or an enterprise is represented by a Distinguished Name (DN) attribute. As defined in Request for Comment (RFC) 1779, DN attribute is a text string that contains unambiguous identifying information for an associated user, group, or object. DNs are used when a change is made to a user or group directory entry. Directory server entries are typed by an objectclass attribute, which allows searching for those entries with a particular value to the objectclass attribute. To search a company's sales department of a United States corporation, for example, an Directory server query in the Uniform Resource Locator (URL) format:

ldap://ldap.corp.com/ou=sales,o=corp,
c=us??sub?objectclass=person

This returns all person entries in the directory tree below the entry named by Organizational Unit Name=sales; Organization Name=corp; and Country Name=US. After entries are made for a directory, administration of these entries can be made easier by grouping these entries.

As shown before in FIG. 3, typical directory tree organizes entries only hierarchically. This structure may not be optimal for short-lived or changing organizations where groupings can be made based on an arbitrary user attribute. Moreover, in a typical directory system, a client application is tasked with determining the type of groupings desired and providing the logic for search requests to achieve the desired results. One could garner some efficiencies in the client application logic by pushing some complexity to the server side. But there is no known system that provides such a solution. Accordingly, there is discovered a need for an advancement in the art.

SUMMARY

An X.500 (or LDAP) style directory service provides a standard interface for client software to retrieve information about entities (usually people and network elements) from a centrally managed data repository. For example, an e-mail server application may want to retrieve the e-mail address for a person by supplying the person's full name. A traditional directory server can apply certain semantics to the information it holds, based on client identity. For example, rights to modify a password attribute may only be granted to the user's own password and to an administrator from the same department as the user. However, extending this type of enhanced interpretation of directory data in the context of a system function outside the directory server proved problematic.

As an example, consider a web accounting application that needs to restrict the creation of purchase orders to purchasing department staff, unless the order value is less than $1000 in which case managers can place orders. With a traditional Directory Service the application can choose to store an attribute for each person entry which dictates the maximum value purchase order that person may create. This scheme has the disadvantage that the logic behind the assignment of order value to each person may be lost.

In addition, if the purchase policy should change, the value must be changed for each and every person. So, another approach would be to store a description of the purchasing polity in the directory server, or perhaps externally. This scheme retains the policy logic, and allows easy policy changes, however the accounting software now has to "understand" the directory structure and schema. In addition, when there are many such applications, each one will now have its own policy mechanism most likely all incompatible meaning increased training and support costs.

The presently disclosed mechanisms—roles and class of service—seek to provide directory applications like the purchasing example above with a mechanism by which they can delegate to the directory server responsibility for implementing their policies. Thus the benefits of a centrally managed directory service (one management mechanism, tight control can be maintained) are retained while allowing directory applications to flexibly implement a range of policies.

For example, consider the case of a corporate purchase implemented in a system that provides for roles and class of service. One can define a role signifying ability to enter purchase orders. This might have a filter like "employee type=manager or department=purchasing". The purchasing application now needs only to compare the role attribute on a given person's entry in the directory with the name of the "can purchase" role to determine if a purchase request is valid. In addition, one might define a class of service which generates an attribute indicating the maximum purchase order value for every employee. The definition can be such that employees without the "can purchase" role have a zero value; employees with the can purchase role and who are not in the purchasing department have value 1000; and those with the "can purchase role" which are in the purchasing department have value 1000000000. Note that in this example no real data is stored in user entries—the directory server generates the data from the policies embodied in the role and class of service definitions. The following table shows some differences between approaches:

|  | Central Management | Ease of Maintenance | Complexity |
|---|---|---|---|
| Static groups | Yes | No | Medium |
| Dynamic groups | Yes | Yes | High |
| External Application Logic | No | Possibly very high |  |
| Roles and COS | Yes | Yes | Low |

Accordingly, in an aspect, the present disclosure is directed toward grouping entries in a directory server. In particular, two methods of grouping entries and sharing attributes between entries are disclosed. These are "roles" and "class of service."

Role is a comprehensive grouping mechanism. In a client-server directory system, roles transfer some of the complexity to the directory server. A role is defined by its role definition entry. Roles enable applications to locate the roles of an entry, rather than select a group and browse the members list. Additionally, roles allow for support of generated attribute values, and directory server-performed membership verification for clients. By changing a role definition, a user can change an entire organization with ease. Any client with appropriate access privileges can discover, identify and examine any role definition. Any client with an appropriate access privilege can add a new role definition, or modify existing role definitions. Further, role definitions can be replicated in a distributed environment. Each role has entries called "members." Members of a role are said to "possess" the role.

A client application can perform the following operations on roles.

(1) Enumerate the members of the role;
(2) Obtain an enumerated list of role members, which can be useful for resolving queries for group members quickly;
(3) Determine whether a given entry possesses a particular role;
(4) Determine the roles possessed by an entry, which can help a client-side application to determine whether the entry possesses the target role;
(5) Enumerate all the roles possessed by a given entry;
(6) Assign a particular role to a given entry; and
(7) Remove a particular role from a given entry.

A client application can check role membership by searching the nsRole attribute, which is computed by the directory server and therefore is up-to-date. From the point of view of a client application, the method for checking membership is uniform and is performed on the server side.

Roles are classified as simple and complex. An example of a simple role is a Managed role, which allows a user to create an explicit enumerated list of members. Managed roles are added to entries using the nsRoleDN attribute. Examples of complex roles include (i) Filtered Roles, (ii) Nested Roles, and (iii) Enumerated Roles.

Briefly stated, the difference between the role types relates to their capabilities, which depend on the implementation of these devices. For example, a managed role is just a label stored with a directory entry, whereas a filtered role is defined by the characteristics of entries. So one uses a "managed" role when one wants to just "give" or assign a role to an entry. When one wishes to identify all the entries with some characteristic, e.g., everyone who is a manager and works in a designated building, a filtered role—which uses an LDAP filter in order to search a designated portion of the directory system and to identify those entries that possess the characteristics described in filter—is used. Nested roles are those that contain or include other types of roles. Enumerated roles are possessed by an arbitrarily assigned list of entries that may have nothing in common otherwise.

Filtered roles allow a user to assign entries to the role depending upon the attribute contained by each entry. In an embodiment, a user assigns entries by specifying an LDAP filter. Entries that match the filter are said to possess the role. Nested roles allow a user to create roles that contain other roles. The user specifies the roles nested within a nested role by using the nsRoleDN attribute. An enumerated role provides an arbitrary list of members each of which possesses the enumerated role. The members that possess an enumerated role need not have any other common feature than the fact that they are all enumerated together in a particular list. Enumerated roles are similar to static groups except that no nesting is allowed within an enumerated role. If an enumerated role is possessed by a member which is itself a nested role, then the server software may take an indefinite action with regard to that member. A second difference between enumerated roles and a static group is that it is illegal to add a member to an enumerated group where that entry lies outside the subtree specification.

Class of Service (CoS) allows a user to share attributes between entries in a way that is transparent to an application. This is achieved by generating the values of the attributes by a CoS logic at the time of or immediately prior to the time the entry is transmitted to an application, rather than storing the values of the attributes with the attribute itself. In alternative embodiments, the attributes may be generated at a time well before the time the entry is transmitted to an application.

A CoS includes a CoS Definition entry and a Template entry. These two entries interact to provide attribute values to target entries within their CoS "scope" based on the DN of the CoS Definition entry, the attribute value stored in the target entry's CoS Template, and other factors. An entry may be within the scope of a CoS Definition entry but may not be qualified to receive a value from the scheme made up of CoS Definition and templates. A CoS specifier is an attribute which contains a value. The value of the CoS specifier is the attribute type which must be present in the entry and the value of that attribute determines the class of the target entry. The absence of that attribute may determine if the target entry qualifies for a default value under the scheme. Thus, the presence or absence of the target entry's CoS specifier determines whether the target entry qualifies for a value.

The CoS Definition entry, which is stored as an LDAP subentry below the branch at which it is effective, identifies the type of CoS being used. The Template entry contains a list of attribute values that are shared. Any change made to the template entry's attribute values is automatically applied to all entries that share the attribute. Depending on how a Template entry is identified, three types of CoS are contemplated in this disclosure: Classic CoS, a Pointer CoS, and Indirect CoS. Classic CoS identifies a template entry by both its DN and the value of one of a target entry's attributes. Pointer CoS identifies a template entry using only a Template DN. There can be only one Template DN for each pointer CoS. Indirect CoS identifies a template entry using the value of one of a target entry's attributes, which must contain the DN of an existing entry.

Roles and Classic CoS can be used together to provide role-based attributes, which appear on a target entry because the target entry possesses a particular role with an associated CoS template.

BRIEF DESCRIPTION OF THE DRAWINGS

These and other features of the principles disclosed herein are more readily understood from the following detailed description and the accompanying drawings where like numbers designate like parts, which drawings are incorporated in and constitute a part of this specification, and wherein.

FIG. 7 illustrates a managed role definition;

FIG. 8 illustrates an instantiation of a managed role;

FIG. 9 depicts a filtered role definition;

FIG. 10 shows a nested role definition;

FIG. 11 shows an enumerated role definition;

FIG. 18 shows a Classic CoS definition;

FIG. 19 shows an example of two corresponding template entries using Classic CoS;

FIG. 22 illustrates a Pointer CoS definition;

FIG. 24 shows an indirect CoS definition.

DETAILED DESCRIPTION

A. Computer Architecture

The presently disclosed system and method can be implemented using hardware, software or a combination of hardware and software. Specifically, the disclosed system and method can be implemented using either object-oriented programming languages, like the Java and C++ programming languages, or procedural programming languages such as the C programming language. The disclosed system and method can be implemented using a computer system with a single personal computer or a network of multiple computers.

Reference will now be made in detail to exemplary embodiments of the disclosed system which are also illustrated in the accompanying drawings. Although the description includes exemplary embodiments, it can be easily seen that other embodiments are possible, and changes can be made to the embodiments described without departing from the spirit of the disclosed system and method.

Figure 5:
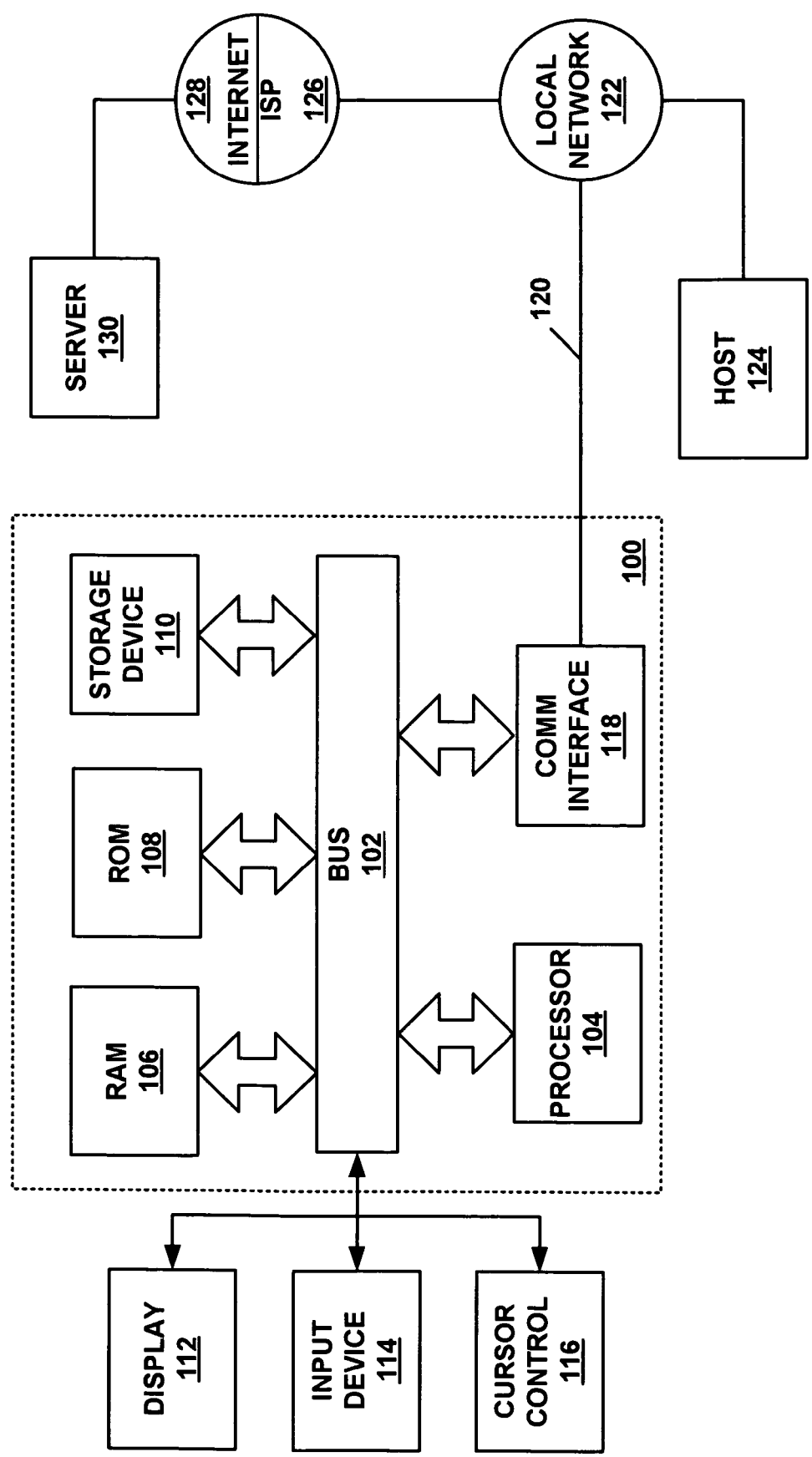
FIG. 5 is a block diagram that illustrates a computer system upon which an embodiment of the disclosed system and method can be implemented.

FIG. 5 is a block diagram that illustrates a computer system 100 upon which an embodiment of the disclosed system and method can be implemented. Computer system 100 includes a central processor unit (CPU) 104 such as the SPARC® microprocessor, which is coupled via bus 102 to other devices such as memory device 106 such as a semiconductor memory or other Random Access Memory (RAM) device, storage device 110 such as a disk drive, input device 114 such as a keyboard, mouse, joystick, touch-sensitive pad, microphone or camera, and output device 112 such as CRT, flat-panel display, speaker, Light Emitting Diodes, or the like. Computer system 100 also includes a communication interface 118 coupled to bus 102. Communication interface 118 provides a two-way data communication coupling to a network link 120 that is connected to local network 122. Configured on the storage device 110 is a one or more databases such as the LDBM, the Oracle Relational Database Management System, or a flat file. It should be noted that the one or more databases could be configured on a different processor or set of processors than the CPU 104, and could be coupled to the computer system 100 via a network connection.

Consistent with one implementation of the disclosed system and method, information from the multiple remote resources is provided by computer system 100 in response to CPU 104 executing one or more sequences of one or more instructions contained in main memory 106. Such instructions can be read into main memory 106 from another computer-readable medium, such as the storage device 110. Execution of the sequences of instructions contained in main memory 106 causes CPU 104 to perform the process steps described herein. In an alternative implementation, hard-wired circuitry can be used in place of or in combination with software instructions to implement the disclosed system and method. Thus implementations of the disclosed system and method are not limited to any specific combination of hardware circuitry and software.

As used in this application, the word selection or input includes inputting any information by way of pressing a key, mouse button, touching a touch-sensitive area, spoken word (s), infra-red or other optical method, or via a wireless method.

The term "computer-readable medium" as used herein refers to any medium that participates in providing instructions to CPU 104 for execution. Such a medium can take many forms, including but not limited to, non-volatile medium, volatile medium, and transmission medium. Non-volatile medium includes, for example, optical or magnetic disk, such as storage device 110. Volatile medium includes dynamic memory, such as main memory 106. Transmission medium includes coaxial cable, copper wire and fiber optics, including the wires that include bus 102. Transmission medium can also take the form of an acoustic or a light wave, such as that generated during radiowave and infrared data communication. Common forms of computer-readable media include, for example, a floppy disk, a flexible disk, hard disk, magnetic tape, or any other magnetic medium, a CD-ROM, any other optical medium, punch cards, paper-tape, any other physical medium with patterns of holes, a RAM, PROM, EPROM, a FLASH-EPROM, any other memory chip or cartridge, a carrier wave as described hereinafter, or any other medium from which a computer can read.

Various forms of computer readable media can be involved in carrying one or more sequences of one or more instructions to CPU 104 for execution. For example, the instructions can initially be carried on magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to main memory 106, from which CPU 104 retrieves and executes the instructions. The instructions received by main memory 106 can optionally be stored on storage device 110 either before or after execution by CPU 104.

Communication interface 118 can be an integrated services digital network (ISDN) card or a modem to provide a data communication connection to a corresponding type of telephone line. As another example, communication interface 118 can be a local area network (LAN) card provide a data communication connection to a compatible LAN. Wireless links can also be implemented. In any such implementation, communication interface 118 sends and receives electrical, electromagnetic or optical signals that carry digital data streams representing various types of information.

Network link 120 typically provides data communication through one or more networks to other data devices. For example, network link 120 can provide a connection through local network 122 to a host computer 124 and/or to data equipment operated by an Internet Service Provider (ISP) 126. ISP 126 in turn provides data communication services through the Internet 128. Local network 122 and Internet 128 both use electric, electromagnetic, or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the presently disclosed system and method, one such downloaded application links a user to a directory record by associating a unique reference identifier with both the user and the record, as described herein. The received code can be executed by CPU 104 as it is received, and/or stored in storage device 110, or other non-volatile storage for later execution. In this manner, computer system 100 can obtain application code in the form of a carrier wave.

Figure 1:
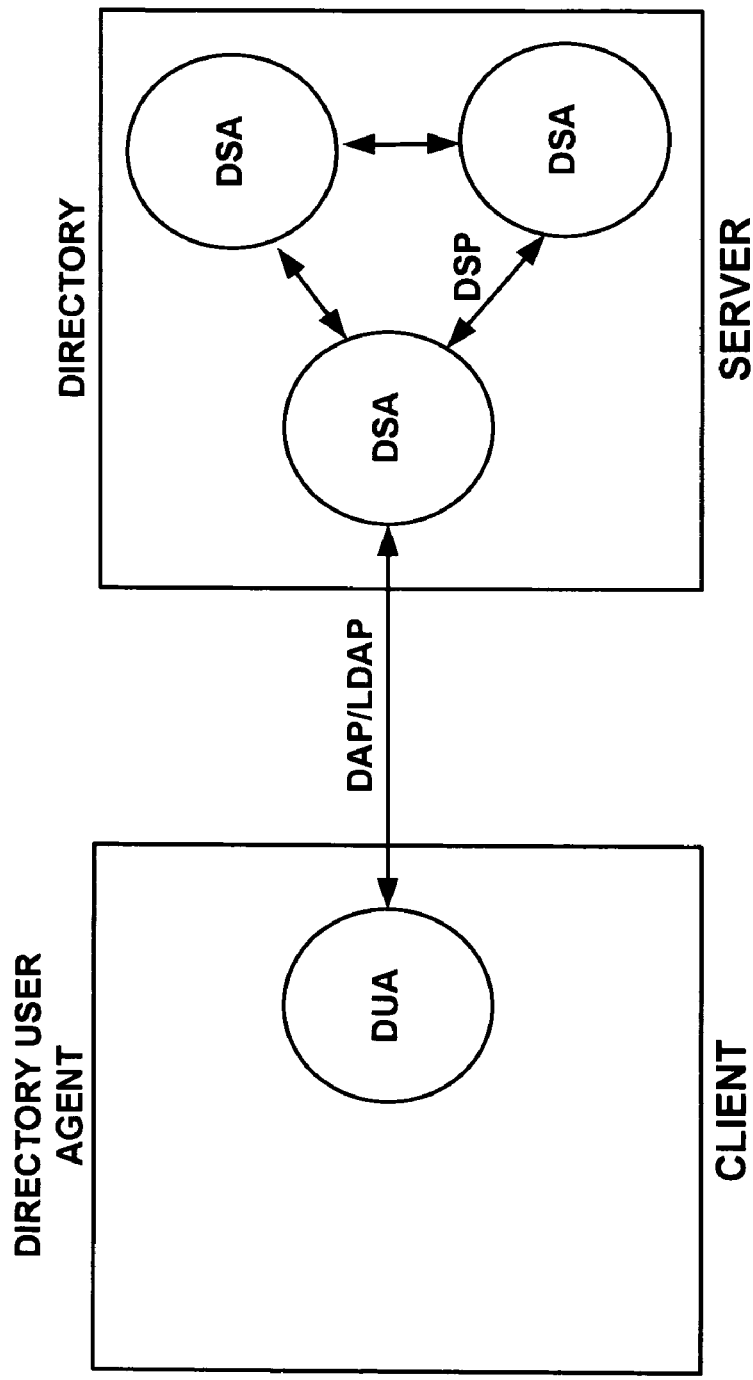
FIG. 1 is a client-server architecture depicting a directory server interacting with a directory user agent.
Figure 2:
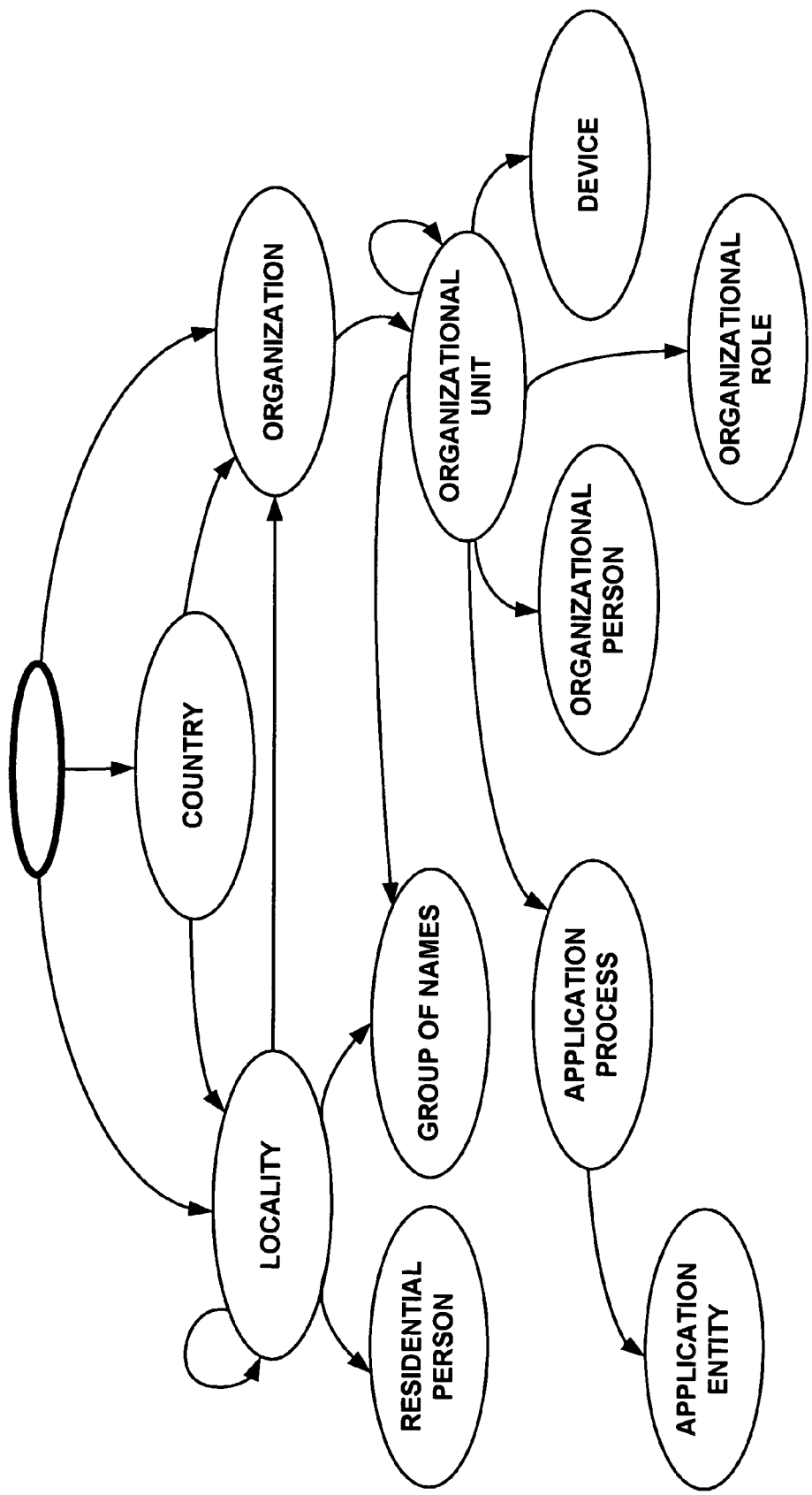
FIG. 2 shows the relationship between some X.500 object classes.
Figure 3:
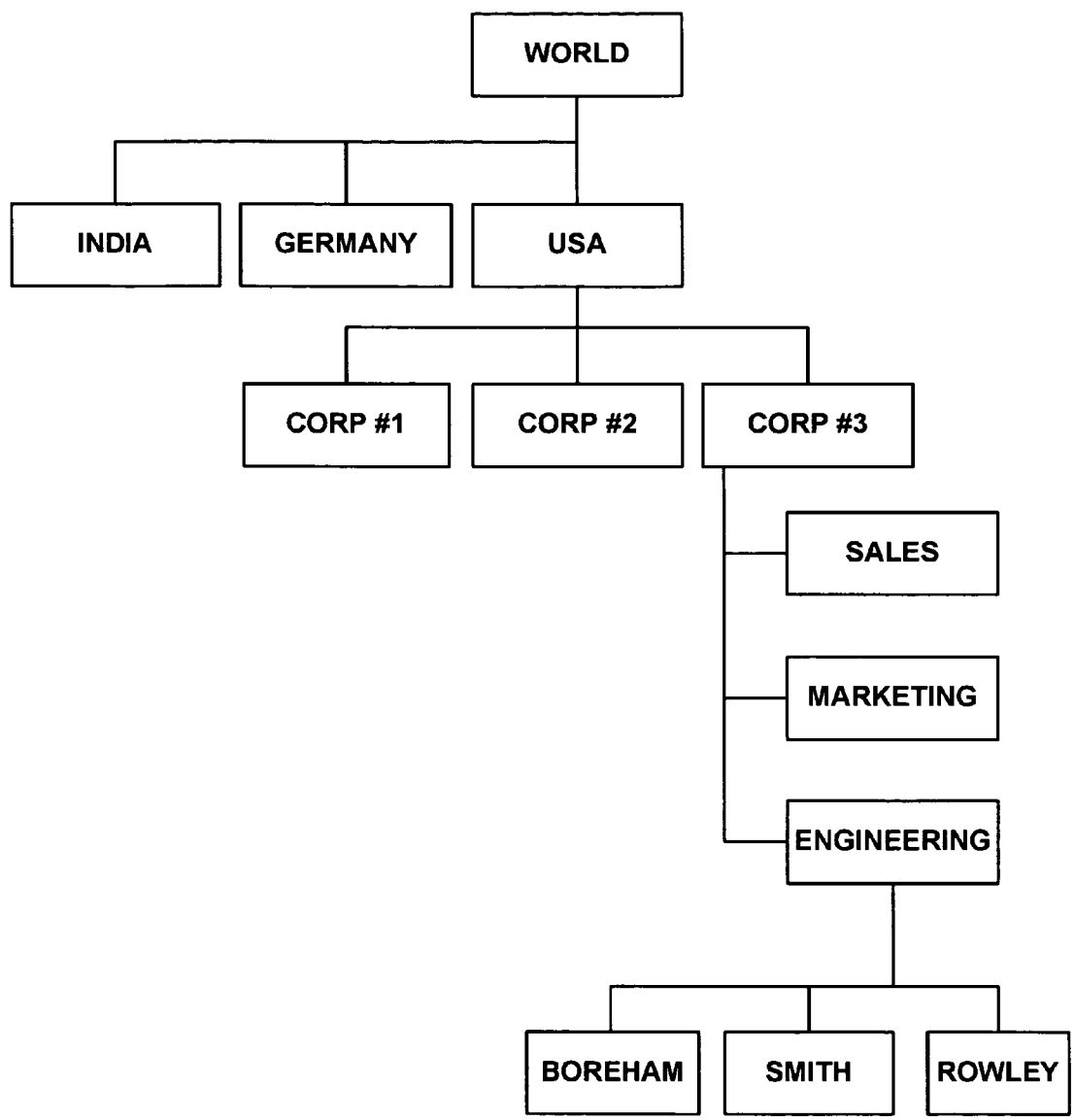
FIG. 3 shows a hierarchically arranged instance of X.500 data tree.
Figure 4:
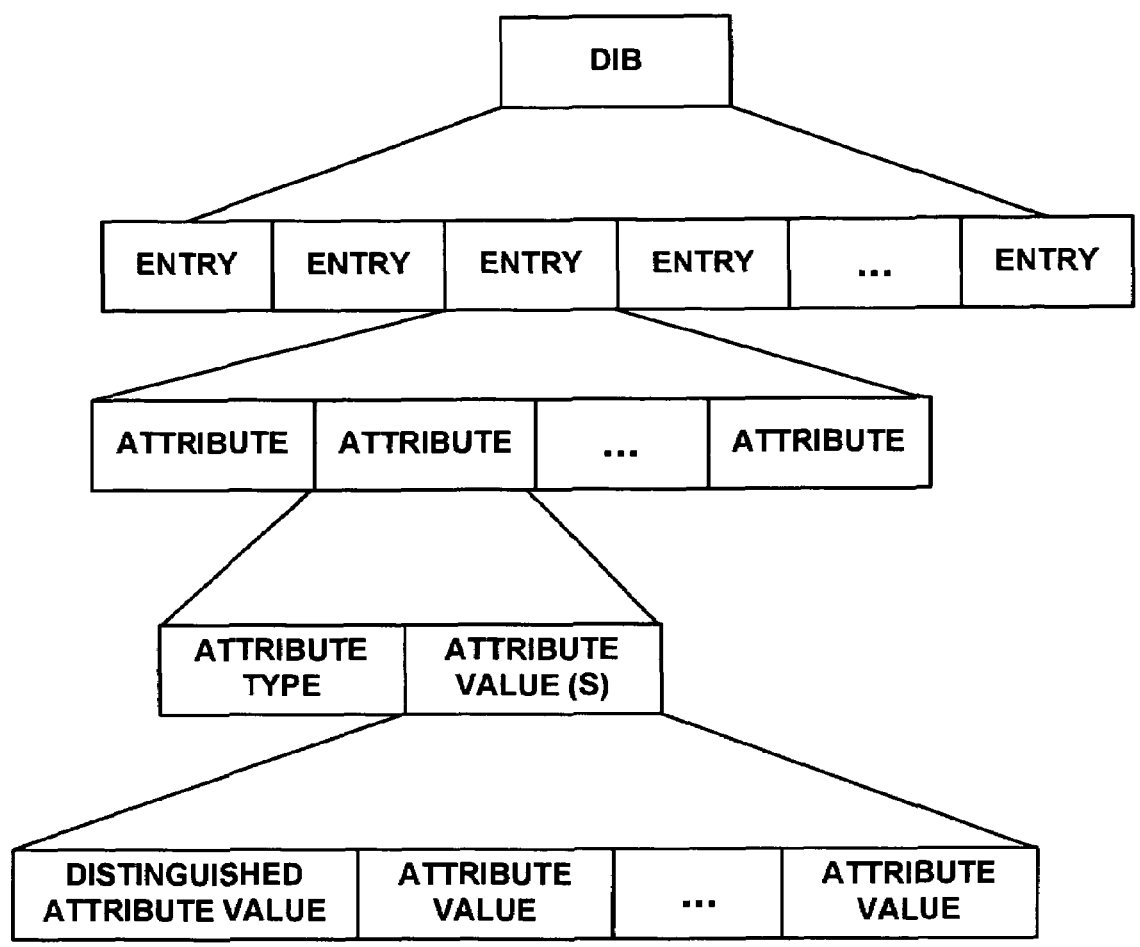
FIG. 4 depicts a directory information model.

Although computer system 100 is shown in FIG. 1 as being connectable to one server, 130, those skilled in the art will recognize that computer system 100 can establish connections to multiple servers on Internet 128. Furthermore, the computer system 100 is one that can be configured to perform the function of (an X.500 or an LDAP) directory server as will be explained in the following.

B. Overview of Static and Dynamic Groups

Groups are typically defined based on certain common characteristics of the members of the groups. A member can be included in a group if the member has an attribute of a specific type. Groups can be static or dynamic. A "static" group is one which where membership is specified by presence in a list. An analogy would be a piece of paper with a list of names. Anyone named on the paper is in the group. Membership may change at any time, just as one might cross a name off the paper list or write in a new name. So they are not terribly static.

A dynamic group is one where membership is inherent in some property of the entries. For example a group containing a number of persons in a building might be "everyone on the third floor", and this would be defined by a filter (query) against the directory for "floor=3". As people are moved around the building, they may become part of the floor3 group, or leave it, depending on their location. A key feature of dynamic groups is that they require no explicit maintenance—a static group which is intended to contain everyone on the third floor would need to be maintained, either manually or by a script and so would be either prone to error or not always up to date. There are also implementation efficiency issues relating to static versus dynamic groups. Thus, in a dynamic group, instead of looking at a group attribute to verify if a user possesses the group attribute, membership is determined by checking a user attribute, which can be specified arbitrarily.

C. Overview of Roles

A role is a comprehensive entry grouping mechanism, similar to the group concept. Role unifies the concepts of static and dynamic groupings, but transfers some of the complexity to the server side from the client side. While dynamic groups contemplate a hierarchical tree-like structure of an organization, roles assume that logically an organization structure could be substantially flat or hierarchical.

The directory system expresses the fact that an entry possess a role by placing the Distinguishing Name (DN) of the role in a computed and operational attribute, for example, the nsRole attribute. A computed attribute is one that is computed on the fly; it is a result of a computation. A computed attribute does not need to exist in a physical form; it can be stored temporarily in memory. An LDAP operational attribute is one that is available only if requested. The attribute nsRole is both computed and operational.

Each entry assigned to a role contains an attribute called nsRole, which is a computed attribute that specifies all of the roles to which an entry belongs. Roles enable applications to locate the roles of an entry, rather than select a group and browse the members list. Additionally, roles allow for support of generated attribute values, and directory server-performed membership verification for clients. By changing a role definition, a user can change an entire organization with ease. Moreover, roles can use the LDAP Virtual List View (VLV) control mechanism to enumerate the membership in a role.

A role is defined by a role definition entry. A role is uniquely identified by the distinguished name (DN) of its defining entry. Role definition entries are implemented as LDAP subentries. Thus, a role definition entry inherits subentry mechanism for scope of application to a DIT subtree. An aspect of a role is that each role is defined by an entry stored in the DIT. Any client or program executing on the a client with appropriate access privileges can discover, identify and examine any role definition. Any client or client program with an appropriate access privilege can add a new role definition, or modify existing role definitions. Further, role definitions can be replicated in a distributed environment.

Each role has entries called "members." Members of a role are said to "possess" the role. Two varieties of roles are possible: simple roles, and complex roles. This classification, in one aspect, allows for implementation efficiency and supports some management functions. A client application can perform the following operations on roles.

(1) Enumerate the members of the role.

(2) Obtain an enumerated list of role members, which can be useful for resolving queries for group members quickly.

(3) Determine whether a given entry possesses a particular role.

(4) Determine the roles possessed by an entry, which can help a client-side application to determine whether the entry possesses the target role.

(5) Enumerate all the roles possessed by a given entry.

(6) Assign a particular role to a given entry.

(7) Remove a particular role from a given entry.

A client application can check role membership by searching the nsRole attribute, which is computed by the directory server and therefore is up-to-date. From the point of view of a client application, the method for checking membership is uniform and is performed on the server side.

Roles and Dynamic Groups

One of the differences between roles and dynamic groups is that dynamic groups impose a requirement on a directory client program to retrieve and correctly process the group definition. This makes client software more complex, reduces performance and brings the potential for errors on the client, either accidental or deliberate. Roles introduce an abstract membership test mechanism which allows responsibility for membership to rest with the directory server. The client only has to know the name of a role which is of interest to it, and how to test role membership in general.

Role Operations

Given arbitrary roles and entries, the following operations are useful to clients:

1. Enumerate the members of a role (i.e., provide an answer to the question, "which entries have this role?") It is also useful to be able to resolve this query in a reasonable time (significantly less than the time to find the members by brute force examination of all the entries). It is also useful to be able to retrieve the entries in a paged or browsing fashion, using the existing LDAP VLV mechanism.

2. Determine whether a given entry possesses a particular role. It is useful to be able to do this more efficiently than by determining all the roles possessed by the entry and then checking whether the target role is among that set of roles.

3. Enumerate all the roles possessed by a given entry.

4. Assign a particular role to a given entry.

5. Revoke a particular role from a given entry.

It should be noted that when operations are performed on roles, the CPU 104 can be programmed to search for roles possessed by entries using boolean operators. More specifically, the following boolean operators can be used in determining whether an entry possesses a given role.

| Operator | Symbol | Operation |
|---|---|---|
| Equal | = | An instance of a search attribute exactly matches a role possessed by an entry. |
| Contains | * | A wild card operator to allow presence check or partial matches. |
| Sounds like | ~= | Operator used in name searches. |
| Greater than or equal | >= | Used in numerical searches. |
| Less than or equal | <= | Used in numerical searches. |
| Negation | ! | Used to negate an expression. |
| AND | & | Used to combine expressions. |
| OR | \| | Used to select from expressions. |

Simple and Complex Roles

Imagine that all roles were treated similarly. A role definition could be as complex as required or desired. An example of a highly complex role would be that of a nested role whose component roles included filters using custom matching rules and attribute syntax.

1. Membership enumeration: to enumerate the members, a client would need to separately enumerate the component roles, by submitting search operations to the server. The results would need to be aggregated by the client, eliminating any duplicates. This can be more complex and onerous for users that need only simple role operations.

2. Determine whether a given entry possesses this role: this is difficult for a client to do. A brute force method would inefficient. Some associative indexing scheme could potentially help but can be hard to implement in an efficient manner.

3. Enumerate all the roles possessed by a given entry— this is more computationally complex than determining whether an entry possesses a particular role.

4. Assign a particular role to a given entry—this also computationally complex, because it requires semantic knowledge of role definition.

5. Revoke a particular role from a given entry—similar to (5) above, this is complex because it requires semantic knowledge of role definition.

Figure 6:
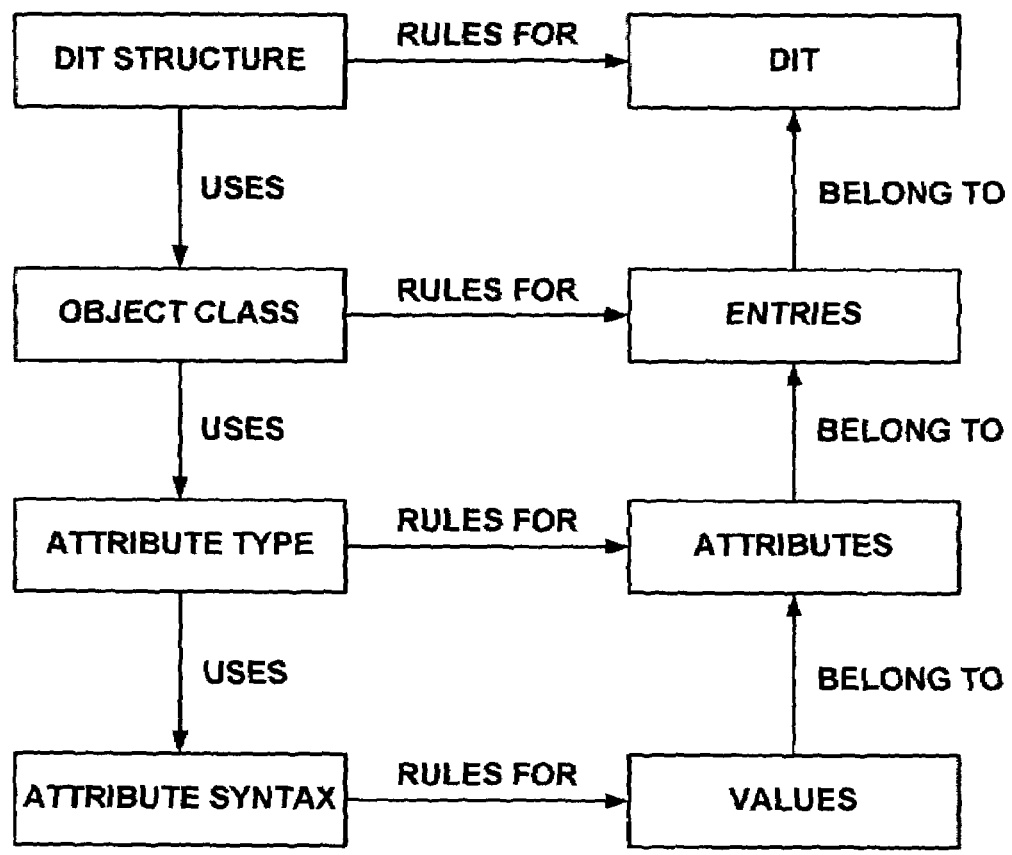
FIG. 6 depicts the relationship between Object Classes and Attribute Types/Syntax to Entries.

For a complex role such as the example used above, it is hard or very hard to implement any of the five desirable role operations. Therefore it would be convenient to define a role type with deliberately limited flexibility, which role is called a "simple" role. The simple role allows all five of the desirable role operations to be implemented relatively easily and efficiently. Any role that is not a simple role is by definition a complex role. In the role definition schema, there are two "abstract" object classes to distinguish between simple and complex roles: nsSimpleRole and nsComplexRole. The relationship between Object Classes and Attribute Types/Syntax to Entries are shown in FIG. 6.

Simple Roles

A simple role has the following properties:

1. Enumerating role membership is easily and efficiently implemented—This enumeration can be done using VLV controls, allowing for better scaling and user experience.

2. Computationally less complex and efficient to test an entry for possession of a particular role.

3. Computationally less complex and efficient to enumerate the simple roles a particular entry possesses.

4. It is obvious by inspection of the role definition how to assign a simple role to a given entry.

5. It is obvious by inspection of the role definition how to revoke a simple role from a given entry.

Complex Roles

Roles which are not simple are deemed complex, with the implication that one or more (perhaps all) of the five operations are computationally more complex than for the simple roles. Clients and management agents can determine whether a given role is of the simple or complex kind, allowing a user interface (UI) to act appropriately. The application developer can choose not to support or support in a limited or inefficient manner some server features which use roles, when the target role is complex. Internal to the server, it is also possible to deliver notification to subsystems when entries move in and out of simple group membership. This can be used to keep metadata cached for performance reasons coherent with the DIT contents.

Implementing Simple and Complex Roles

Role is a more flexible entry grouping method than dynamic groups in part because a role allows a client to obtain the results normally obtained using static or dynamic groups without increased client complexity. A role can be configured in a number of ways to provide different results. Four types or roles are disclosed herein. They are, (1) Managed Role; (2) Filtered Role; (3) Nested Role; and (4) Enumerated Role.

Managed Role

An example of a simple role is a managed role with object class nsManagedRole. Managed roles are added to an entry by adding the nsRoleDN attribute to the entry. Membership of a managed role is conferred upon an entry by adding the role's DN to the entry's nsRoleDN attribute.

A "managed" role is one that can be configured to provide search results similar to those available with a static grouping mechanism, i.e., to create a group entry that contains a list of members. Managed roles allow a user to create an explicit enumerated list of members. FIG. 7 shows an example of a managed role definition. FIG. 8 depicts an example entry with a managed role.

An example of an entry with this role is as follows.

Defining a Managed Role

As an example, suppose one wants to create a role to be assigned to all marketing staff. Membership of a managed role is conferred upon an entry by adding the role's DN to the entry's nsRoleDN attribute. The user can execute a script "ldapmodify" as follows:

ldapmodify -D "cn=Directory Manager" -w secret -h host -p 389

Then the user can specify a managed role as follows:

dn: cn=Marketing,ou=people,dc=siroe,dc=com
    changetype: add
    objectclass: top
    objectclass: LDAPsubentry
    objectclass: nsRoleDefinition
    objectclass: nsSimpleRoleDefinition
    objectclass: nsManagedRoleDefinition
    on: Marketing
    description: managed role for marketing staff The user can then assign the role to a marketing staff member named Bob by executing ldapmodify as follows:

ldapmodify -D "cn=Directory Manager" -w secret -h host -p 389
    dn: cn=Bob,ou=people,dc=siroe,dc=com
    changetype: modify
    add: nsRoleDN
    nsRoleDN: cn=Marketing,ou=people,dc=siroe,dc=com
    add: description
    description: Has the marketing managed role
    . . .

Complex Roles

Three kinds of complex roles are disclosed herein, viz, filtered, nested and enumerated roles, with corresponding object classes nsFilteredRole, nsNestedRole and nsEnumeratedRole. Other complex role types are also possible.

Filtered Role

A "filtered" role can be configured to provide results similar to those produced by a dynamic grouping mechanism. This can be achieved by configuring the entries in such a way as to match a "filter". Dynamic groups allow a user to filter entries that contain a particular attribute and include them in a single group. After creating a role in a similar manner to that of a managed role, a user assigns entries to a filtered role based on a particular attribute contained by each entry. This is done by specifying an LDAP filter. Entries that match the filter are said to possess the role.

A filtered role specifies an LDAP filter of arbitrary complexity. Entries matching the filter and within the sub tree specification are said to possess the role. FIG. 9 shows an example of a filtered role definition.

Defining a Filtered Role

As an example, consider a filtered role for sales managers. The user can execute a script "ldapmodify" as follows:

ldapmodify -D "cn=Directory Manager" -w secret -h host -p 389

The user can then specify the filtered role as follows:

dn: cn=SalesManagerFilter,ou=people,dc=siroe,dc=com
    changetype: add
    objectclass: top
    objectclass: LDAPsubentry
    objectclass: nsRoleDefinition
    objectclass: nsComplexRoleDefinition
    objectclass: nsFilteredRoleDefinition
    cn: SalesManagerFilter
    nsRoleFilter: o=sales managers
    Description: filtered role for sales managers The following entry would match the filter and therefore be a member of this filtered role:

dn: cn=Pat, ou=people,dc=siroe,dc=com
    objectclass: person
    cn: Pat
    sn: Pat
    userPassword: bigsecret
    o: sales managers
    Description: has a filtered role

Nesting in Groups

Suppose a static group points to a list of entries. If one of these entries in the list happens to be a group, the client side code should identify and interpret that as a group and expand the group to obtain the entries that fall into that group. If there is no client-side code to identify and interpret a group in a list of entries, then the entry representing a group will be treated as an entry representing an individual member. This is the way nesting is performed in LDAP groups. Thus, in the case of static groups, the client has to interpret the nesting, and when it comes across a group, it has to expand the group.

Nested Role

Nesting with roles can be easily achieved. A nested role is a container of other roles. To nest, the DNs corresponding to the roles are added or encapsulated to form the nested role. A "nested" role can be configured to provide an additional level of abstraction by nesting different role types—filtered, managed, enumerated or nested—whereby an entry can be a member of any one of the roles in the nesting. Nested roles allow a user to create roles that contain other roles. A nested role can be created with no members nested. Alternatively, a nested role may contain one or more members. It should be noted that the nesting or encapsulation is performed if (1) the target entry is within the scope of the role; and/or (2) target entry is within the scope of the role that causes the target entry to possess the nested role.

For example, if a target entry possesses manager role, then it also possesses the megamanager role. Likewise, if a target entry possesses network manager role, then it also possesses the megamanager role. These two roles, sales manager role and network manager role are nested within the megamanager role. There can be an arbitrary number of nested within the megamanager role. In this example, an object class nsNestedRole defines the megamanager role to be a nested role. Included in this nesting are the two roles—sales manager and network manager—possessed by the megamanager role. It should be noted that an entry cannot be assigned a nested role. An entry may possess a nested role by also possessing a role which is nested within the nested role.

Assume an E-mail application. Suppose one wishes to send a message to both sales managers and network managers. Assume further that the sender is aware of the E-mail address of the megamanager role. With nested role, the E-mail can be directed toward the megamanager role, and all roles that are nested within the mega manager role—in this example, all sales managers and all network managers—will receive a copy of the E-mail. To do this the application has only to test to ensure that the candidate entry to whom it sends the E-mail possesses the megamanager role, and not the particular role, whether sales manager or network manager. In the case of static groups, the client application has to interpret a group to decide whether an entry is a member of the group. In the case of roles, there is no need to do this. It is sufficient to test for the role value in the nsRole attribute.

The roles nested within the nested role are specified using the nsRoleDN attribute. FIG. 10 shows an example of a nested role definition.

Defining a Nested Role

Suppose a user wishes to create a role that contains both the marketing staff and sales managers contained by the roles created in the previous examples. A nested role created using the script "ldapmodify" may appear as follows:
 dn: cn=MarketingSales,ou=people,dc=siroe,dc=com
 changetype: add
 objectclass: top
 objectclass: LDAPsubentry
 objectclass: nsRoleDefinition
 objectclass: nsComplexRoleDefinition
 objectclass: nsNestedRoleDefinition
 cn: MarketingSales
 nsRoleDN: cn=SalesManagerFilter,ou=people,dc=siroe, dc=com
 nsRoleDN: cn=Marketing,ou=people,dc=siroe,dc=com Both the users in the previous examples, Bob and Pat, would be members of this new nested role.

Defining an Enumerated Role

An enumerated role, as the name indicates, is an enumeration or a list of members. These members are members that possess this role. The members need not have anything else in common. Only individual members, and not roles such as the aforementioned sales manager roles are allowed in an enumerated role.

An enumerated role is the static group reborn, but with two important differences. No nesting is allowed within an enumerated role, which permits a valuable optimization not possible with static groups. The behavior of an enumerated role that includes a nesting can be undefined or implementation-dependent.

Another difference between static groups and enumerated roles is that enumerated roles have a scope and LDAP groups do not have scope. Scope of a role includes, as defined elsewhere in this application, all entries in the directory tree that are at or below the level at which the role is defined. It is illegal to add a member to an enumerated group where that entry lies outside the subtree specification. The directory server software interprets an enumerated list and performs a required operation on the list members. An example of an enumerated role definition is shown in FIG. 11.

Taking the E-mail application example from before, if an E-mail is sent to an address that is mapped to the DN of peonrole, which is an enumerated role, then the client tests for the existence of the role peonrole and routes the E-mail to all entries that possess peonrole.

Table 1 lists object classes and attributes associated with each role type. Table 2 delineates how the roles are implemented.

TABLE 1

Object Classes and Attributes for Different Role Types

| Role Type | Object Class | Attributes |
|---|---|---|
| Managed Role | nsManagedRoleDefinition | description (optional) |
| Filtered Role | nsFilteredRoleDefinition | nsRoleFilter |
|  |  | description (optional) |
| Nested Role | nsNestedRoleDefinition | nsRoleDN |
|  |  | description (optional) |
| Enumerated Role | nsEnumeratedRoleDefinition | groupmember |
|  |  | description (optional) |

TABLE 2

Role Implementation

| | Managed Role | Filtered Role | Nested Role | Enumerated Role |
|---|---|---|---|---|
| Membership Enumeration | LDAP search with filter nsRoleDN = <role's dn> (indexed and supports VLV) | LDAP subtree search with baseDN from the subtree specification and filter from the nsRoleFilter attribute. (VLV indexing optional) | No generic method. | No generic method. |
| Membership test | LDAP compare against nsRoleDN attribute. | LDAP compare against nsRole attribute. | LDAP compare against nsRole attribute. | LDAP compare against nsRole attribute or LDAP compare entry's DN against Role's groupmember attribute. |
| Role Enumeration | Read nsRoleDN attribute. | Read nsRole attribute. | Read nsRole attribute. | Read nsRole attribute. |
| Assign Role | LDAP modify, add role's DN to nsRoleDN attribute. | Marginally meaningful. | Marginally meaningful. | Add entry's DN to the role entry's membership list. |
| Revoke Role | LDAP modify, remove role's DN from nsRoleDN attribute. | Marginally meaningful. | Marginally meaningful. | Remove entry's DN from the role entry's membership list. |

It should be noted that roles inherit from the ldapsubentry object class which is defined by the IETF based in part on the subentry concept defined in the ISO standard, ISO/IEC X.509. Further, it should be noted that once roles are created, graphical user interfaces can be designed to view, edit, modify, inactivate, reactivate, or delete role or role entries.

Roles and Access Control

Access control rules can be defined such that the roles possessed by an entry determine its access rights. A directory server stores information to control access to roles in an attribute named Access Control Information (ACI). ACI stores the directory server access control information for a particular entry. ACIs take the general form aci: (<target>)(version 3.0;aci"<name>"; <permission><bind rule>;)

where,

<target> defines the object, attribute, or filter used to define what resource to controlling access to. The target can be a DN, one or more attributes, and/or a single LDAP filter. Target identifies what directory entry the ACI applies to. The target can be, (a) a directory entry (usually a branch of an organization's directory tree); (b) a directory entry and one or more entry attributes; or (c) a group of entries and/or attributes that are the result of a single LDAP filter.

version 3.0 is a required string that identifies the ACL version.

acl "<name>" is a name for the ACI. <name> can be any string that identifies the ACI. The ACI name is required.

<permission> defines the actual access rights and whether they are to be allowed or denied. Permissions specify the type of access allowed or denied. An organization can either allow or deny an entity from performing specific operations to the directory. The various operations that can be assigned are known as rights. In one implementation, by default all users are denied access rights of any kind. The exception to this is the user defined in the Root DN parameter of an LDAP directory. This user is known as the root or unrestricted user. The unrestricted user has full access to a directory regardless of the permissions set for the directory. For this reason, user must set some permissions for a directory if a user wants any normal users to be able to access the directory. There are two parts to setting permissions: (a) Allowing or denying access; and (b) Assigning rights.

<bind rule> identifies the circumstances under which the directory log in must occur in order for the ACI to take effect. Binding refers to logging in or authenticating to the directory. The circumstances under which binding occurs determine whether access to the directory is allowed or denied. Every permission set in an ACI has a corresponding bind rule that details the specific circumstance under which binding must occur for the ACI to be applied. Bind rules can be simple, for example, a bind rule can simply state that the person accessing the directory must belong to a specific group. Bind rules can also be more complex, for example, a bind rule can state that a person must belong to a specific group and must log in from a machine with a specific Internet Protocol (IP) address, during between 8 AM and 5 PM. Whether access is allowed or denied depends on whether an ACI's bind rule is evaluated to be true. Bind rules use one of the two following patterns: (a) <keyword>="<expression>"; and (b) <keyword>!="<expression>", where equal (=) indicates that <keyword> and <expression> must match in order for the bind rule to be true, and not equal (!=)

indicates that <keyword> and <expression> must not match in order for the bind rule to be true. Bind rules tell who can access the directory, when, and from where. More specifically, bind rules specify the users and groups that can access the directory, the location from which an entity must bind, the time or day on which binding must occur, or the type of authentication that must be in use during binding. Additionally, bind rules can be complex constructions that combine bind methods using Boolean operators. More on ACI syntax is located at http://docs.iplanet.com/docs/manuals/directory/admin30/adminix.htm, visited Feb. 8, 2001, which description is incorporated herein by reference in its entirety.

To implement access control for roles, the ACI syntax of a directory server could be extended to support a "role" property. In some cases a user may wish to protect the value of the nsRoleDN attribute with an ACI, as the attribute is writable. Not every role is suitable for use in a security context. When creating a new role, consider how easily the role can be assigned to and removed from an entry. Sometimes it is appropriate for users to be able to easily add themselves to or remove themselves from a role. For example, if a user is part of an interest group role called Mountain Biking, the user may want interested users to add themselves or remove themselves easily. But in some security contexts such as account inactivation, it is inappropriate to have open roles. By default, in some implementations, account inactivation roles contain ACIs defined for their suffix. When creating a role, the server administrator can decide whether a user can assign themselves to or remove themselves from the role.

For example, user A possesses the managed role (MR). The MR role has been locked using account inactivation through the command line. This means that user A cannot bind to the server because the nsAccountLock attribute is computed as "true" for that user. However, suppose the user was already bound and noticed that he is now locked through the MR role. If there are no ACLs preventing him, the user can remove the nsRoleDN attribute from his entry and unlock himself.

To prevent users from removing the nsRoleDN attribute, the following ACIs may be appropriate depending upon the type of role being used.

Access Control with Managed Roles

Because management of managed roles requires access rights to modify the target entries, it becomes important to control access appropriately to the nsRoleDN attribute. Access control rules can be defined which restrict modification access rights to just the nsRoleDN attribute. Furthermore, access control rules can be defined such that a particular client is restricted to adding or removing a specific set of values. This means that a particular client will be able to, say, assign and remove access to the accounting application (which is done by means of a managed role), but the same client can not promote users to the system administrator managed role.

For entries that are members of a managed role, use the following ACI to prevent users from unlocking themselves by removing the appropriate nsRoleDN:

```
aci: (targetattr="nsRoleDN")
     (targetattrfilters="
         add=nsRoleDN:(!(nsRoleDN=cn=AdministratorRole,dc=siroe,
             dc=com)),
del=nsRoleDN:(!(nsRoleDN=cn=nsManagedDisabledRole,dc=siroe,
dc=com))")
     (version3.0;aci "allow mod of nsRoleDN by self but not to critical
         values";
         allow(write)
         userdn="ldap:///self";)
```

Access Control with Filtered Roles

The attributes that are part of the filter should be protected so that the user cannot relinquish the filtered role by modifying an attribute. The user should not be allowed to add, delete and modify the attribute used by the filtered role. If the value of the filter attribute is computed, then all attributes that can modify the value of the filter attribute should be protected in the same way.

Access Control with Nested Roles

A nested role includes filtered and/or managed roles, so the above points should be considered for each of the roles that include the nested role.

Roles Within Scope of an Entry

Figure 12:
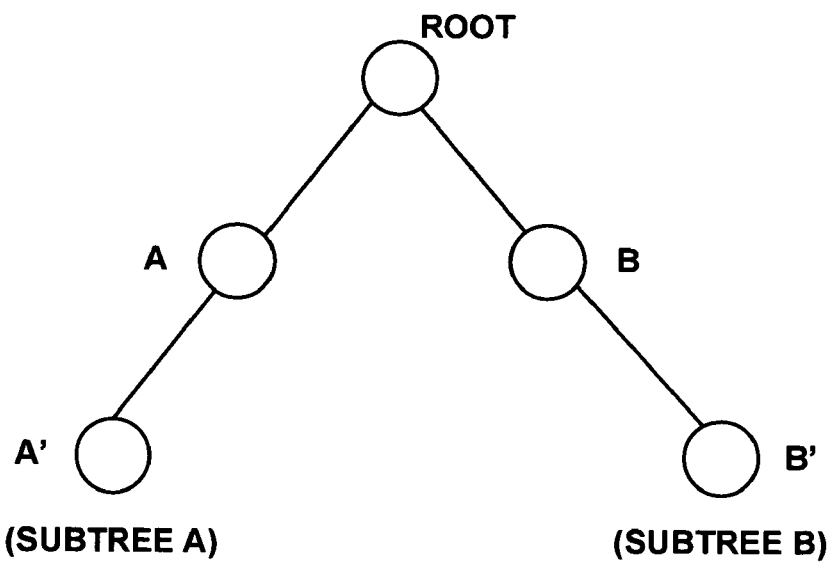
FIG. 12 illustrates the concept of scope of a role.

Every entry possessing a role has a "scope". The scope of a role starts at the parent of the role entry and extends to all entries hierarchically below the parent. The scope of a role at a given role entry determines which other entries can possess the same role. For example, assume that there are two hierarchies of directories A and B (tree-structures) connected at the root level, as shown in FIG. 12.

Thus, the scope of a role defined for an entry at (subtree) level A includes all the entries that are at and below subtree A. It should be noted that the scope of the role defined for an entry at (subtree) level A does not include any entries that are defined at or below the subtree B. In this way, the scope is a way of limiting the search for entries that possess a particular role. For example, suppose two roles, both called Administrator, are defined at two subtrees A and B respectively. This could happen, for instance, in an organization where subtree A is the directory hierarchy for computer systems that are in a particular network (e.g., one campus of a company or a university), and the subtree B is the directory hierarchy for computer systems that are in a different network (e.g., a different campus). Though there could be two administrator roles, one for each campus network, access permissions granted to one campus administrator could be different from those granted to an administrator of a different campus. The scope of subtree A limits any access rights granted to an administrator of campus A from allowing an entry possessing that administrator role to access computers under subtree B.

Implementing Role Functions

The following algorithms can be used to implement certain role functions described above. It should be noted that persons of ordinary skill in the art can choose to implement these algorithms by altering the order of the steps described herein or by making inconsequential modifications.

a. Enumerating Entries that Possess a Role

Figure 13:
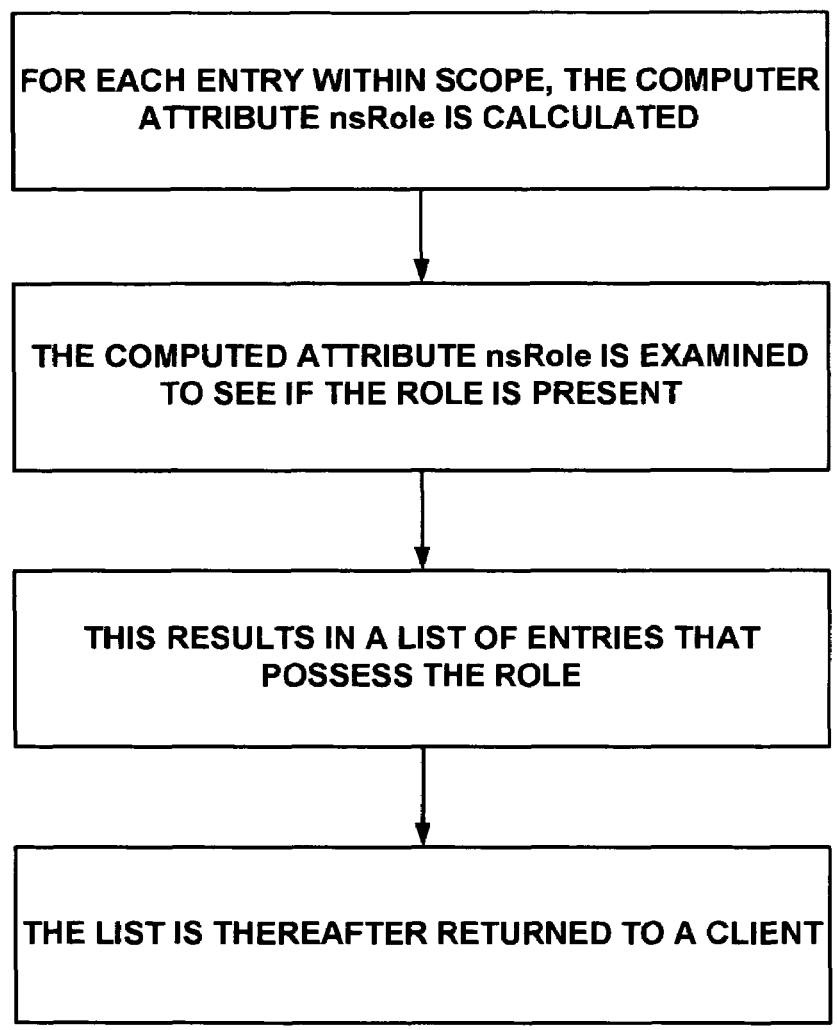
FIG. 13 depicts the steps performed at the server in enumerating the entries that possess a given role.

FIG. 13 depicts the steps performed at the server in enumerating the entries that possess a given role: For each entry within scope, the computed attribute nsRole is calculated and then examined to see if the role is present. This results in a list of entries that possess the role. The list is thereafter returned to a client. The client receives the results of the search and enumerates all the entries returned.

Deciding Between Roles and Groups

Roles transfer some complexity from the client side to the server side. With roles, clients can check role membership by searching the nsRole attribute. In the case of roles, the method for checking membership is uniform from the point of view of the client application, and is performed on the server side.

On the other hand, dynamic groups offer no client application support from the server to provide a list of group members. Instead, the application retrieves the group definitions and then runs the filter. For static groups, the application must make sure that the user is a part of a particular UniqueMember value. In this case, the method for determining group membership is not uniform for all applications.

Managed roles allow a user to perform all actions performed normally on static groups. Filtered roles allow a user to perform all actions normally performed on dynamic groups. While they decrease client side complexity, roles increase the server side complexity, because evaluating roles is more resource intensive.

D. Overview of Class of Service

In many cases, properties considered to belong to an individual user profile are in fact determined as a group by the user's "class of service" (CoS). Consider for example a voice mail system. Each user is subject to a number of resource limits including the number of messages permitted in their mailbox; the maximum length of message which can be recorded; whether or not they're allowed to make outgoing calls via the automated attendant. Rather than storing the individual values for each of these resource limits on each users' directory entry, several classes of service are defined, each with resource limits appropriate to a different type of user. The "superuser" class might have very high resource limits while the "ordinary user" class would have lower limits. Now each user's directory entry need only contain the service class to which they belong. This is both smaller than the complete set of resource limit attributes, and also much easier to manage because the number of service classes is much smaller than the number of users.

As an example, suppose a directory contains thousands of entries all of which share a common attribute for fax number, facsimileTelephoneNumber. Traditionally, in order to change the fax number, a client application would have to update each entry individually. This is a large administrative task, and sometimes there could be a risk of not updating all entries.

CoS enables the user to generate the attribute facsimileTelephoneNumber dynamically. The attribute facsimileTelephoneNumber is stored in one location in memory or in storage, and each entry points to that location to give a value to the entry's fax number attribute. To a client application, the CoS attributes appear just like all other attributes of an entry, despite that CoS attributes are not stored with the entries themselves.

Figure 14:
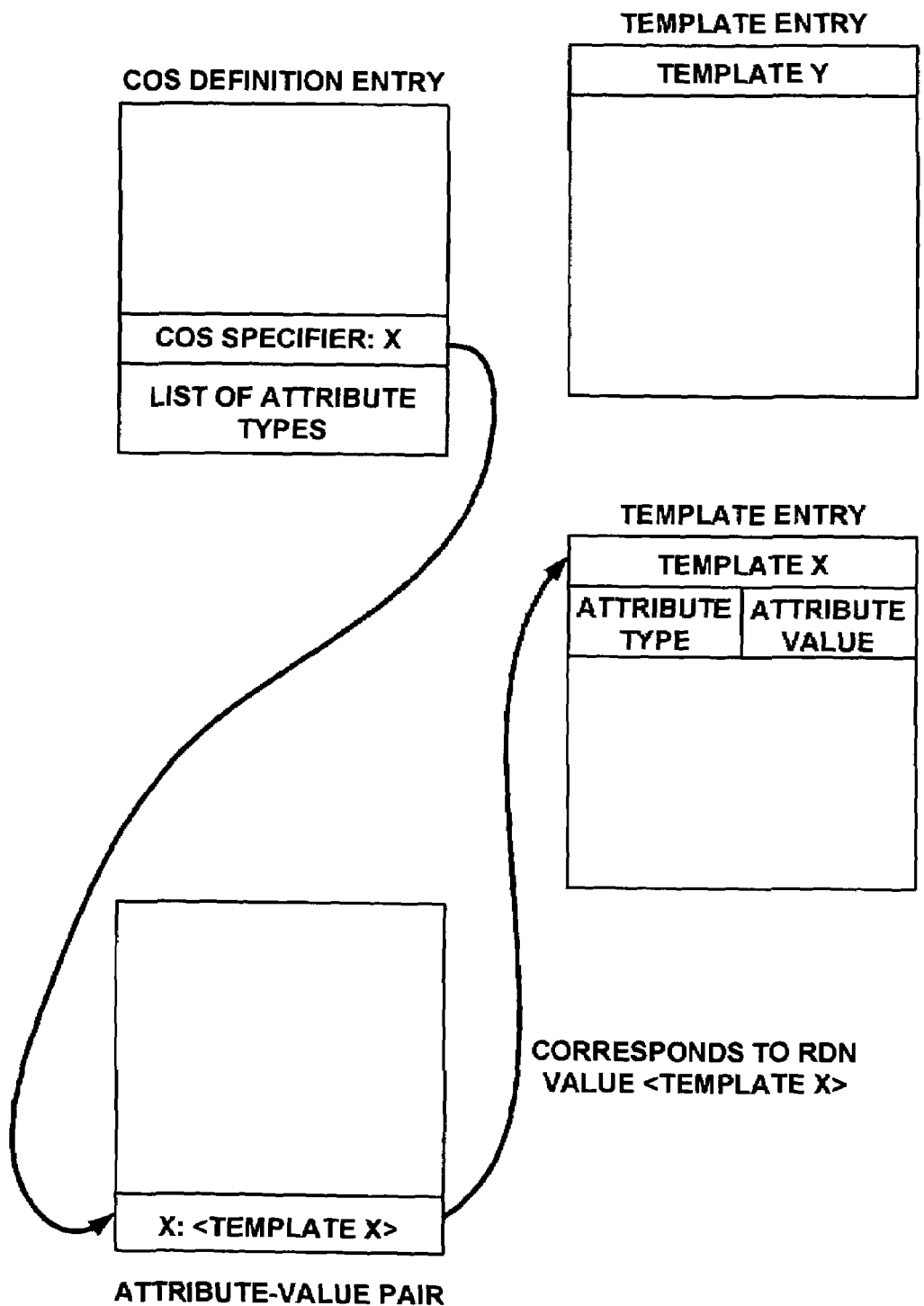
FIG. 14 illustrates a Classic Class of Service (CoS) scheme.

As shown in FIG. 14, each CoS includes the following entries in a directory. (1) CoS Definition Entry, which identifies the type of CoS used. CoS is stored as an LDAP subentry below the branch at which it is effective. (2) Template Entry. The template entry contains a list of the shared attribute values. Changes to the template entry attribute values are automatically applied to all the entries sharing the attribute.

Scope of Class of Service

Figure 15:
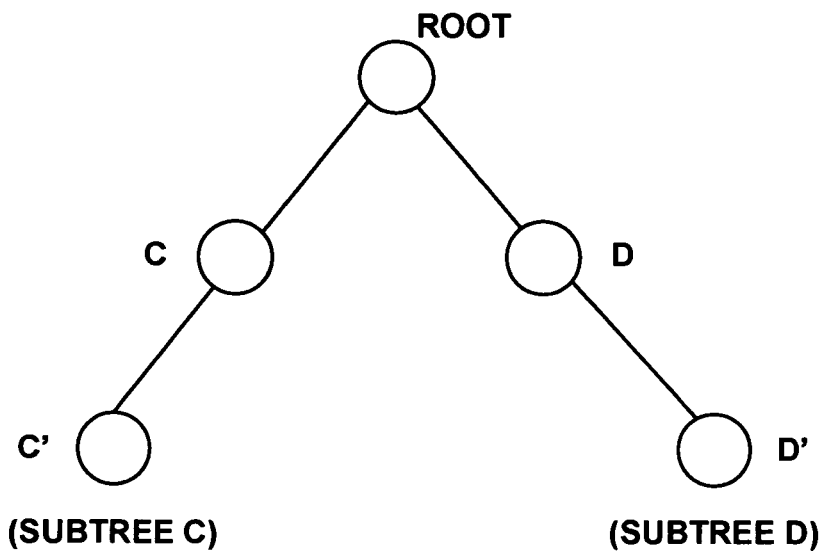
FIG. 15 illustrates the concept of scope of a class of service.

A CoS for a target entry also has a "scope." The scope of a CoS starts at the parent of the CoS definition entry and extends to all entries hierarchically below the parent. The scope of a CoS at a given CoS definition entry determines which other entries can possess the same CoS. For example, assume that there are two hierarchies of directories C and D (tree-structures) connected at the root level, as shown in FIG. 15.

Thus, the scope of a CoS defined for an entry at (subtree) level C includes all the entries that are at and below subtree C. It should be noted that the scope of the CoS defined for an entry at (subtree) level C does not include any entries that are defined at or below the subtree D. In this way, the CoS scope is a way of limiting the search for entries that possess a particular CoS attribute. For example, suppose two CoS entries, both called facsimileTelephoneNumber, are defined at two subtrees C and D respectively. This could happen, for instance, in an organization where subtree C is the directory hierarchy for a particular department (e.g., sales), and the subtree D is the directory hierarchy for a different department (e.g., marketing). Though there could be a different fasimileTelephoneNumber for each department, suppose that faxes to the sales department should not arrive at the fax number for the marketing department, and vice versa. The scope of the CoS attribute facsimileTelephoneNumber at subtree C automatically includes all entries at or below the level A, and all employee entries defined at level C will be listed as having the facsimileTelephoneNumber defined at subtree C.

A CoS includes a CoS Definition entry and a Template entry. These two entries interact to provide attribute values to target entries within their CoS "scope" based on the DN of the CoS Definition entry, the attribute value stored in the target entry's CoS Template, and other factors. An entry may be within the scope of a CoS Definition entry but may not be qualified to receive a value from the scheme made up of CoS Definition and templates. A CoS specifier is an attribute which contains a value. The value of the CoS specifier is the attribute type which must be present in the entry and the value of that attribute determines the class of the target entry. The absence of that attribute may determine if the target entry qualifies for a default value under the scheme. Thus, the presence or absence of the target entry's CoS specifier determines whether the target entry qualifies for a value.

Implementing CoS Feature in a Directory Server

Typically the CoS feature is implemented by an application and not by the storage system which contains the user profile data (e.g. a database or directory server). This however is more by necessity than design, since these storage systems usually don't offer any CoS capability. This section describes a CoS facility for a Directory Server, which is suitably implemented in a plugin. It should be noted that the same general principles can be extended to other storage systems such as a Database, a flat file and the like.

CoS allows a user of a directory server to share attributes between entries in a way that is transparent to a client application. With CoS, some attribute values may not be stored with the entry itself. Instead, the attribute values are generated by a CoS logic as the entry is transmitted to a client application. Clients of the Directory Server read user's entries in the normal way. The clients see attributes on these entries as usual. Some attribute values may not have been stored with the entry however, they have been generated by CoS logic as the entry is sent to the client.

The CoS Definition Entry and the Template Entry interact to provide values to their target entries, which are entries within the scope of CoS Definition entry. The value the CoS Definition Entry and the Template Entry provide to target entries depends on several factors:
 (a) The entry's DN. (different CoS regimes can be maintained for different portions of the DIT).
 (b) A service class attribute value stored with the entry (for example: "nsmail-cos:ordinary" in a Messaging Server). The absence of the attribute altogether can also imply a specific default CoS.
 (c) The attribute values stored in a class template entry. One such entry is selected to supply the attribute values for one particular service class.
 (d) The object class of the entry. CoS attribute values will only be generated where the entry has an object class which allows the attribute. If schema checking is turned off, this rule is not enforced.
 (e) The attribute values stored in some particular entry in the DIT, for example a container entry.
 (f) The attribute values stored in an entry pointed to by a DN stored in an attribute of the entry.

It should be noted that multiple CoS schemes can be defined within a server. In some embodiments, to define schemes such that they conflict with each other might be regarded as an illegal definition.

Figure 16:
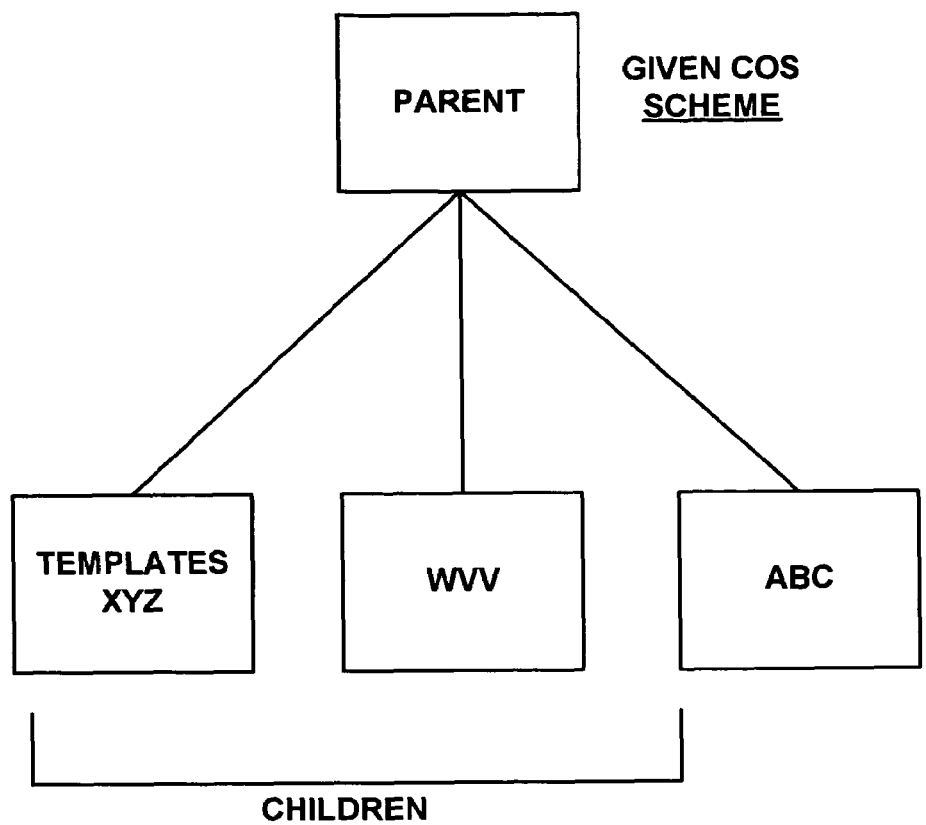
FIG. 16 illustrates the relationship between the class template entries for a given CoS scheme.
Figure 17:
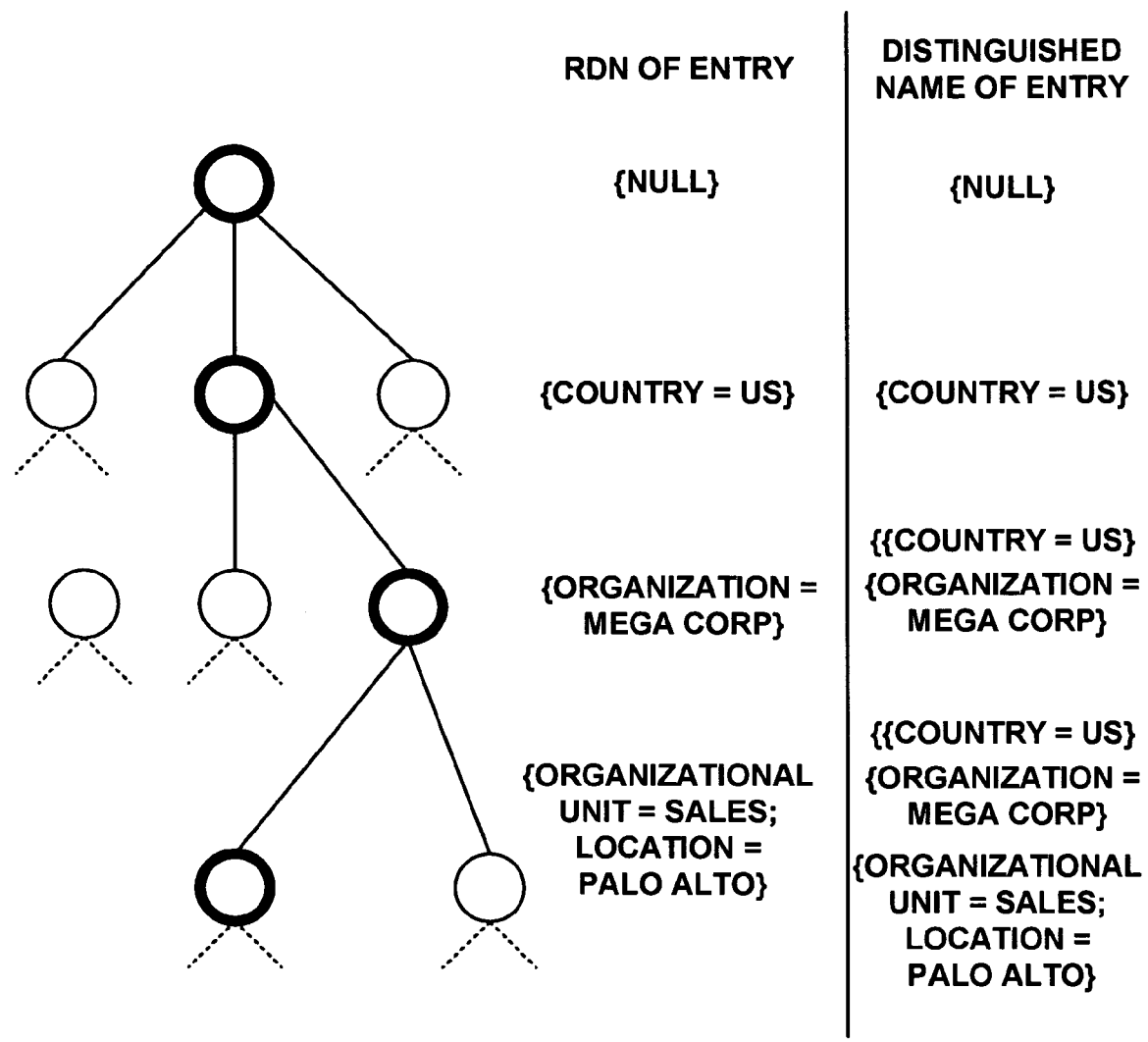
FIG. 17 shows the relationship of an entry's RDN to an entry's DN.

As shown in FIG. 16, the class template entries for a given CoS scheme are all stored in the DIT, as children of a common parent entry. Each directory entry includes a relative DN (RDN). The relationship of an entry's RDN to the entry's DN is pictorially shown in FIG. 17. The relative DNs of the template entries are the respective values of a service class attribute called cosSpecifier and a default RDN called "cosSpecifier-default". The cosSpecifier is an attribute in the CoS Definition entry, whose value is an attribute type that should appear in a target entry, the value of which target entry in turn determines what template entry is to be applied. The default RDN value will be used when the service class attribute value is NULL or not present. For example, a cosDefinition with a cosSpecifier value of "test", would have a default template of "test-default".

First a CoS scheme, which includes a CoS definition, is created. Creating a CoS definition entry results in the creation of a CoS specifier and a list of attributes which could be provided by the CoS definition entry. A CoS scheme also includes a CoS Template entry. In order for the CoS mechanism to work, a CoS scheme must be associated with at least one template entry. If a CoS scheme is not associated with at least one template entry, the scheme is ineffective. A CoS template entry represents a set of attribute-value pairs that could be applied to a target entry. At a later time, any number of template entries—also sometimes referred to as a service class—may be created under a given CoS scheme. These CoS template entries are stored as children of a common parent entry, which could be the CoS scheme entry with which the template entry is associated, or a parent of the CoS scheme entry. Also created with the CoS Definition entry is a list of attribute types that are to appear in target entries; and a value of the CoS specifier, which represents an attribute type that should appear in target entries, and which is used to decide among different possible templates.

From the client perspective, a service class is a property of an entry. The way to decide what class an entry has is by examining the CoS specifier property of the entry and the value of the CoS specifier property in a target entry determines the template entry to be used.

Types of Classes of Service

Classes of service definitions (that is, all the information, save the template entries, needed in order to generate attribute values defined by a CoS) are stored in LDAP Subentries, which can be located anywhere in the DIT. A directory server user may use different types of CoS depending on how the user wishes to generate the values of dynamic attributes. There are three types of CoS: (a) Classic CoS; (b) Pointer CoS; and (c) Indirect CoS. Corresponding to these different types of CoS, CoS definition entries have objectclass cosClassicDefinition, cosPointerDefinition or cosIndirectDefinition:

Classic Class of Service

A classic CoS identifies the template entry by both its DN and the value of one of the target entry's attributes. Classic CoS can have multiple template entries, including a default CoS template to be applied to those entries which do not belong to any other CoS template.

Classic CoS and Roles can be used together to provide role-based attributes. These attributes appear on an entry because it possesses a particular role with an associated CoS template. For example, one could use a role-based attribute to set the server look through limit on any role-by-role basis.

In Classic CoS, template entries are selected based on the value of a specifier attribute in the entry. This is depicted in FIG. 18. In this example, a CoS specified by the attribute "mailServiceClass" is defined. This service class set defines the values of attributes "mailboxquota" and "maySendExternalMail". The values are to be taken from template entries stored in the DIT under "cn=LocalConfig, cn=MailServerCOS". The service classes only pertain to entries within the portion of the tree under "ou=People, o=Netscape.com". FIG. 19 shows an example of two corresponding template entries.

Using Classic CoS to Provide an Attribute-Value Pair to a Client

A client program may never even know the existence of a class of service in a directory system. The client merely looks to obtain a value of an attribute for a given target entry, which could be a target entry. For example, suppose a client queries the directory for a fax number corresponding to a person John Doe. The client sends a request in a way it does to any directory system, whether or not the directory system implemented fax number as a service class. Thus, the client is not aware of the implementation details of how or where the fax number for John Doe is stored or is computed.

Suppose that the organization of which John Doe is a part assigns a shared fax number to John Doe, Jane Roe and other individuals. In a typical directory system, the fax number (i.e., the actual number representing the fax number such as 650-555-1212) is stored in a directory or other database in a record associated with John Doe. But since the attribute is shared by a number of people, and since there could be changes to these people, it is better to store the fax number in one location and assign a fax number attribute to the individual records corresponding to these individuals. In such a scheme, the directory server first receives a request for an attribute-value pair associated with a target entry (John Doe), and looks up to determine which template entry is relevant to determining a value to the attribute requested. This is done by performing a search of a list of attribute-value pairs which are associated with template entries. These template entries are in turn associated with CoS Definition entries for instances of attribute-value pairs that match the requested attribute type. A result of this search is a list of matched list of attribute-value pairs. This list is stored in memory and a number of constraints are applied to the list of matched attribute-value pairs. The resulting attribute-value pair is what is returned to the client.

To apply a constraint to the list, the directory server iterates through the matched list of attribute-value pairs in order to determine (1) if a given attribute-value pair is in the same CoS scope as the requested attribute-value pair, (2) if the CoS specifier of the attribute-value pair matches the specifier of the corresponding CoS definiton, if the CoS specifier of the attribute-value pair matches the corresponding CoS Template. Other constraints that could be applied include whether the attribute-value pair has a priority—i.e., whether it closely matches a CoS scheme to the entry hierarchically, sorted in a priority order, said priority being determined by the position on the disk, etc.

To accomplish this search, advantageously, the CoS Definition entries, the CoS template entries and the target entries may be read from disk to memory so that a fast searching algorithm may be applied in memory, thereby avoiding disk hits.

Pointer Class of Service

In the case of Pointer CoS, there is no CoS specifier, i.e., an entry cannot choose between two or more CoS schemes. A pointer CoS identifies a template entry using only the entry's Template DN. For each pointer CoS, the definition points to a single template entry (template DN). A pointer CoS applies to all entries within the scope of the template entry.

Figure 20:
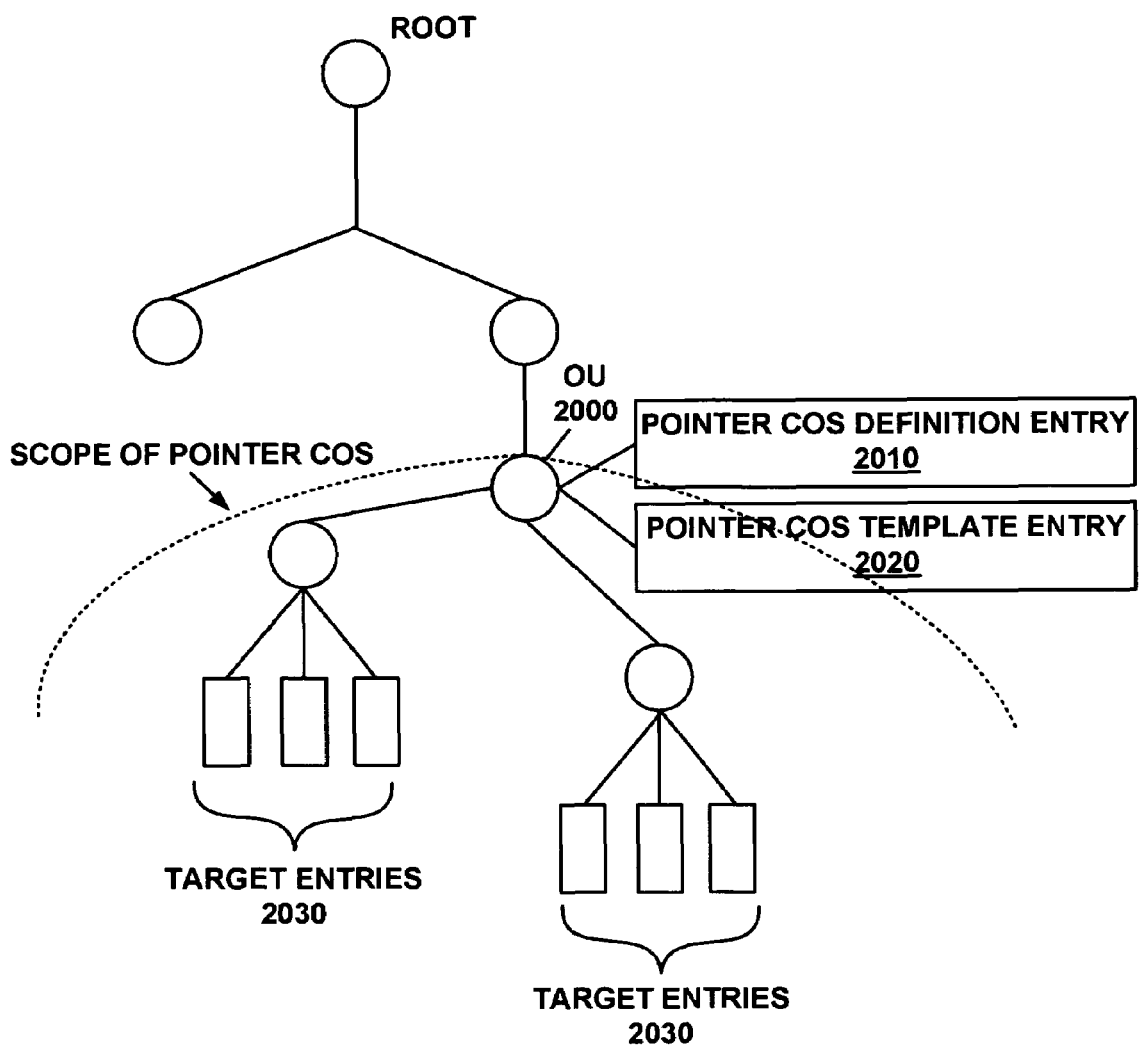
FIG. 20 illustrates a Pointer CoS scheme.
Figure 21:
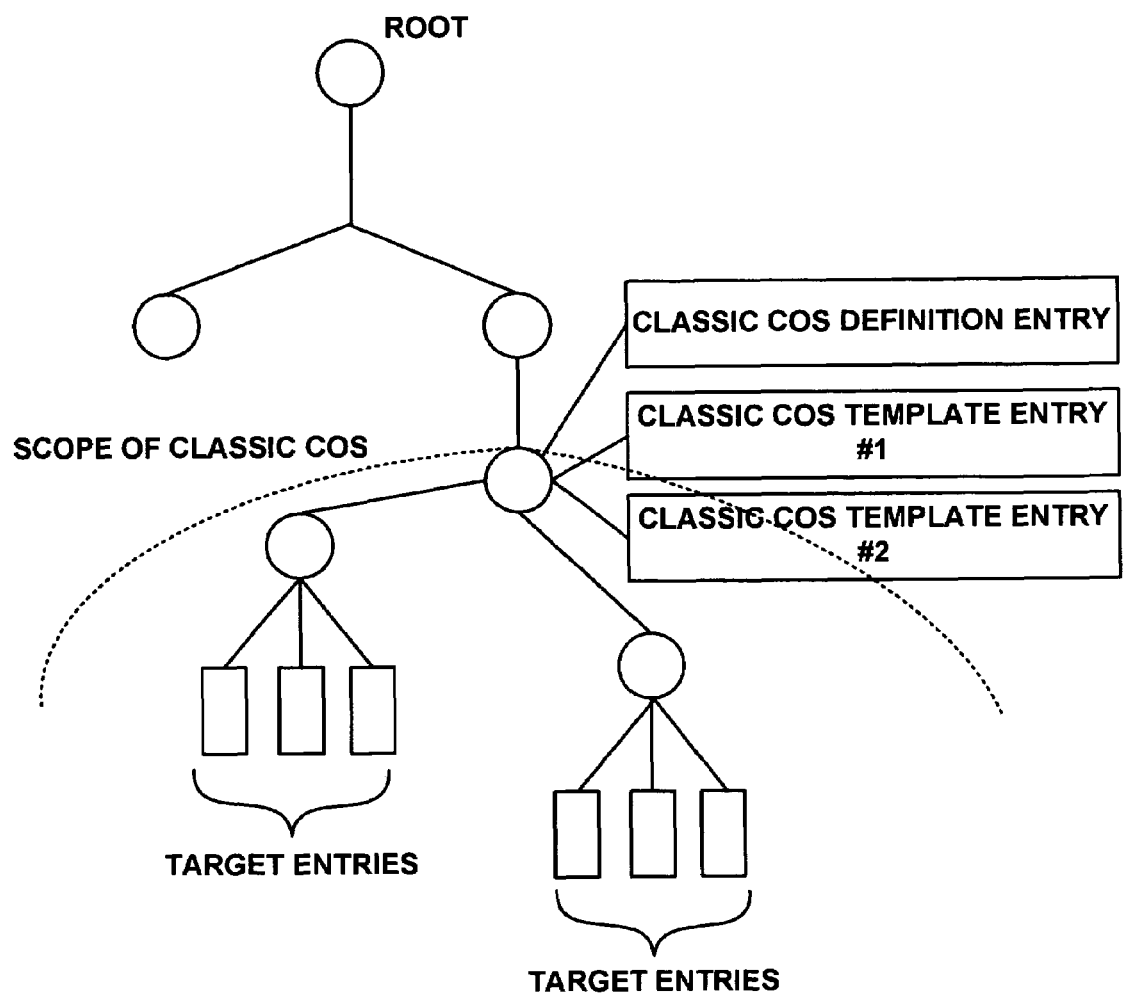
FIG. 21 illustrates a Classic CoS scheme.

Referring to FIG. 20, which shows a diagrammatic version of a pointer CoS in a Directory Information Tree (DIT), at a branch node 2000, a Pointer CoS is defined by two entries, the Pointer CoS Definition Entry 2010 and the Pointer CoS Template Entry 2020. Target entries 2030 that are within the scope of this pointer CoS are also shown. Any target entry within scope of the Pointer CoS definition of the branch node 2000 get the value provided by that template, if they are qualified to get any value. The difference between Classic CoS and Pointer CoS is that in the latter, there is no choice of what value a target entry may get for that CoS scheme. This important difference between Classic CoS and Pointer CoS can be appreciated with reference to a DIT depicting Classic CoS as shown in FIG. 21. An example of a pointer COS is as shown in FIG. 22. In this example, every target entry will inherit the organization's fax number, unless a particular target entry has its own fax number attribute.

Indirect Class of Service

An indirect CoS identifies the template entry using the value of one of the target entry's attributes. In Indirect CoS, template entries are not defined within the CoS Scheme along with the CoS Definition entry. A first target entry may indirectly use a second target entry as a template entry and take on the second target entry's attribute-value pairs. It should be noted, however, that the first target entry's CoS specifier attribute must contain the DN of an existing and valid second target entry. Thus, in indirect CoS, a DN-valued attribute in the first target entry points to a temporary template entry, which is the second target entry's attribute-value set. The value in the attribute-value pair, which represents the CoS specifier must be a DN and must point to a valid entry.

Figure 23:
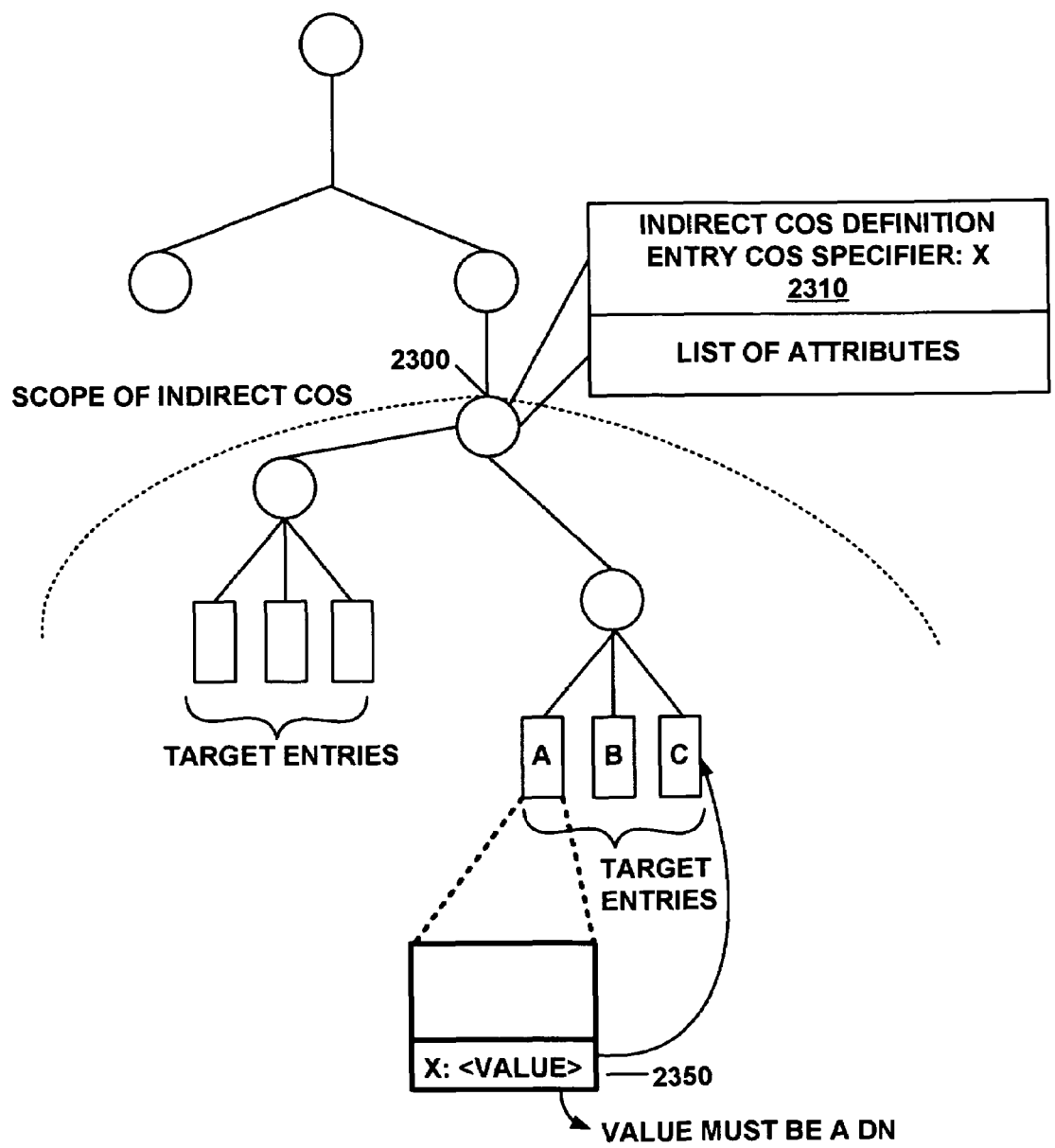
FIG. 23 illustrates an indirect CoS scheme.

Referring to FIG. 23, an indirect CoS scheme contains a CoS Definition Entry 2310, which contains a CoS specifier X and a list of attributes. This CoS specifier X is an attribute such as manager that points to another entry, which could be any entry or another target entry. This list of attributes could include, for example, a fax number attribute that is shared by all the persons in a particular group managed by that manager. Three target entries A, B and C are shown in FIG. 23. Of these entries, C could be a manager of the group. Entry A uses indirect CoS to take on the values for certain attributes, such as fax number, from A's manager, i.e., target entry C. Note that in order for this to be possible, the value given to the CoS specifier X in A's entry must be a valid DN, in this case, the DN of the manager entry C. FIG. 24 shows an example of an indirect CoS. In this example, each person's entry will inherit "accounting code" from their manager's entry. When an employee moves to another department, and thereby his manager changes, accounting codes automatically change to the correct new value when an employee's manager attribute changes.

Interaction with Stored Attribute Values

If the CoS logic in a directory server detects that the attribute whose value it is generating is in fact already stored on the target entry, the default action is to supply the stored value to the client that requested the value of the attribute. However, the server's behavior can be controlled by means of the cosDefinition entry. The cosAttribute values allow an additional qualifier appended after the attribute type name. Valid qualifier values include "override", "default" and "operational". An absent qualifier means the same as "default". Override can mean that the server will always return the value generated by the CoS logic even when there is a value stored with the entry. Default can imply that the server will only return a generated value if there is no corresponding attribute value stored with the entry. Operational can indicate that the attribute will only be returned if it is explicitly requested in the search. In addition, operational attributes suitably are not required to pass a schema check to be returned. Other embodiments can have different methods of implementing this feature. The operational qualifier can be combined with default or override to produce the required behavior.

For example,
    dn:   cn=messaging_server_cos,   cn=cosdefinitions, o=NetscapeRoot
    objectclass: top
    objectclass: cosSuperDefinition
    objectclass: cosClassicDefinition
    cosTemplateDn: cn=LocalConfig, cn=MailServerCOS cosSpecifier: mailServiceClass
cosAttribute: mailboxquota override
cosAttribute: hassmellyfeet default operational
cosAttribute: maysendexternalmail default

A Note on Templates

Since it is possible to create CoS schemes that compete with each other to provide an attribute value, it is desirable to be able to determine which would prevail in such a case. For maximum flexibility, it would also be desirable to be able to do this at the template level such that even templates from the same scheme are prioritized. Note that multiple template matches in the same scheme is possible because the cosSpecifier can be multi-valued, and with role-based attributes, (see Section C. Overview of Roles, supra) this is even quite likely to happen. To this end, the cosTemplate objectclass has a single allowed attribute: cosPriority.

The cosPriority attribute represents the global priority of a particular template as a numeric decimal value. In this priority scheme zero is the highest possible priority with the lower priorities extending towards infinity. Templates with higher priorities will be favored over and to the exclusion of templates with lower priorities. Templates which do not have a cosPriority attribute are considered to have the lowest priority possible, or no priority. In the case where two or more templates are being considered for supply of an attribute value, and they have the same (or no) priority, the result is undefined, but does not exclude the possibility that a value will be returned, however arbitrarily chosen.

Configuration and Management

Because all the configuration information and template data is stored as entries in the directory, standard LDAP tools can be used for configuration and management. Specialized scripts, command-line tools and graphical UI could be developed. These would use the LDAP SDK to inspect and change the configuration. Further discussion of such tools is outside the scope of this document.

Access Control for Class of Service Attributes

The server controls access to attributes generated by a service class in exactly the same way as regular stored attributes. Access control rules depending upon the value of attributes within an entry will behave as expected even when those attribute values are generated by COS.

Implementation Restrictions

In some cases, an LDAP search request containing a filter that references an attribute defined by CoS cannot be serviced. The server will respond with an "unwilling to perform" message when it is presented with such an unsupported request.

E. Implementation and Operation

Roles can be implemented in a product such as the iPlanet Messaging Server and the iPlanet Directory Server marketed by the Sun Microsystems, Inc. and Netscape Communications Corporation Alliance, based in Santa Clara, Calif. These products allow a user in an organization to route mail to groups of users. While this is used as an illustration of the principles disclosed, persons of ordinary skill in the art readily understand that the principles can be practiced in many other applications, and therefore the disclosure should not be limited to only those illustrative uses presented herein.

The Directory Server provides global directory services, i.e., it provides information to a wide variety of applications. A global directory service solves the n+1 directory problem—whereby information replicated in multiple instances of directories could not be managed easily—by providing a single, centralized repository of directory information that any application can access. A wide variety of applications access the directory by way of a communication network. Advantageously, the Directory Server uses LDAP (Lightweight Directory Access Protocol) to give applications access to its global directory service.

The Directory Server can store all of a customer organizational information in a single, network-accessible repository. The following are illustrations of the kind of information an organization might store in a directory:

(i) Physical device information, such as data about the printers in the organization (where they reside, whether they are color or black and white, their manufacturer, date of purchase, and serial number).

(ii) Public information concerning an employee, such as name, E-mail address, and department.

(iii) Private information related to an employee, such as salary, government identification numbers, home addresses, phone numbers, and pay grade.

(iv) Contract or account information, such as the name of the client, final delivery date, bidding information, contract number, and milestone due dates.

The Directory Service could be designed as a general-purpose directory, which serves the needs of a wide variety of applications and provides a standard protocol and application programming interfaces (APIs) to access the information it contains.

The Directory Server, in an embodiment, includes the directory itself, the server-side software that implements the LDAP protocol, and a graphical user interface that allows end-users to search and modify the directory. Other LDAP clients are also available, including the directory managers in a Console and the Address Book feature in Netscape Communicator. In addition, a user can purchase other LDAP client programs or write own programs using an LDAP client Software Development Kit (SDK) included by a Directory Server manufacturer.

Without adding other LDAP client programs, the Directory Server can provide the foundation for an organization's intranet or extranet. A server can be configured to use a directory as a central repository for shared server information such as employee, customer, supplier, and partner data.

Directory Server can be used to manage extranet user-authentication, create role-based access control, set up user preferences, and centralize user management. In hosted environments, partners, customers, and suppliers can manage their own portions of the directory, reducing administrative costs.

An directory client (or client for short) accesses a directory by interacting with a Directory server through the LDAP API, which is a set of functions (or classes) that request the server to perform operations defined by the LDAP protocol. For example, the server responds to a search request by searching the directory and returning a list of the matching entries. Netscape Communicator is an example of an LDAP client; Communicator's address book feature enables a user to look up a person's e-mail address in various directories located on LDAP servers—not only the user's personal address book but also a corporate-wide directory or an Internet-wide directory such as the one available at http://www.Four11.com.

Overview of Directory Server Architecture

A Directory Server includes the following components:
(a) A front-end responsible for network communications,
(b) One or more backend plug-ins for database management, and
(c) A basic directory tree containing server-related data.

The front-end of Directory Server manages communications with directory client programs. The Directory Server may be implemented as a daemon process on UNIX® systems and as a service on Windows-NT®. Multiple client programs can communicate with the server in LDAP format. They can communicate using LDAP over both TCP/IP and SSL/TCP/IP, depending on whether the client negotiates use of Transport Layer Security (TLS) for the connection.

When the communication takes place with transport layer security (TLS), then it is usually encrypted. TLS can be used in conjunction with secured DNS to provide confirmation to client applications that they are binding to the correct server. If clients have been issued with certificates, TLS can be used to confirm that the client has the rights to access the server. TLS or its predecessor SSL can be used in the Directory Server to perform security activities such as message integrity checks, digital signatures, and mutual authentication between servers.

Multiple clients can bind to the server at the same time over the same network because the Directory Server is a multi-threaded application. As directory services grow to include larger numbers of entries or larger numbers of clients spread out geographically, they also include multiple Directory Servers placed in strategic locations around the network.

In an embodiment, the Directory Server relies on plug-ins. A plug-in is a way to add functionality to the core server. For example, an LDBM database is a plug-in. Plug-ins can have a state, i.e., they can be present but disabled. A user can enable any of the plug-ins provided with Directory Server depending upon the functionality the user wants to add to server. In addition, custom plug-ins can be written for Directory Server.

Directory data is stored in an LDBM database. Advantageously, the LDBM plug-in is automatically installed with the directory server and is enabled by default. A user can make as many instances of the LDBM database as needed. The LDBM database is the basic unit of storage, performance, replication, and indexing. A user can perform operations such as importing, exporting, backing up, restoring, and indexing on the database.

In one embodiment, Directory Server uses a single database to configure a directory tree. This database can manage millions of entries. In alternative embodiments, the database supports advanced methods of backing up and restoring data, so that user data is not at risk. Directory Server can support multiple databases. A user can distribute data across the databases, allowing the server to hold more data than can be stored in a single database.

In an embodiment, the Directory Server uses a format such as the LDAP Data Interchange Format (LDIF), which is a standard text-based format for describing directory entries. LDIF is defined in RFC 2849 and is available through sources such as the IETF. An LDIF-compliant directory has one or more directory entries separated by a blank line. An entry is a group of lines in the LDIF file that contains information about an object, such as a person in an organization or a printer on a network. Information about the entry is represented in the LDIF file by a set of attributes and their values. Each entry has an optional entry identifier (ID), a required distinguished name, one or more object classes, and one or more attribute definitions. The object class is attribute that specifies the kind of object the entry describes and defines the set of additional attributes it contains. Each attribute describes a particular trait of an entry.

The basic form of a directory entry expressed in the LDIF format is:

```
dn: <distinguished name>
    <objectclass> <object class>
    <objectclass> <object class>
    ...
    <attribute type>[;subtype]: <attribute value>
    <attribute type>[;subtype]: <attribute value>
    ...
```

Creating an Organizational Entry

Directories often have a top-level entry for an organization. In general, this is the first, root, or topmost entry in a directory. The organizational entry often corresponds tot he suffix set of the directory. For example, if the directory is defined to use a suffix of dc=siroe, dc=com, then the organization entry likely will be named dc=siroe, dc=com. The LDIF specification for an organization entry has the form:

```
dn:<distinguished name>
objectClass: top
objectClass: organization
o: <organization name>
<list of attributes>
...
```

As an example, dn:dc=siroe,dc=com objectclass:top objectclass:organization o:Siroe Corporation description: Fictional company for example purposes telephoneNumber: 555-5555

Specifying Organization Unit Entries

Organizational unit entries are often used to represent major branch points, or subdirectories in a directory tree. They correspond to major, reasonably static entities within an enterprise structure, such as a subtree that contains people, or a subtree that contains groups. However, the organizational unit attribute contained in an entry can also represent a major organization within an enterprise, such as marketing, or engineering. There could be more than one organizational units, and in a typical directory tree, there usually are more than one organizational units.

An organizational unit can be specified in the LDIF format as follows.

```
dn:<distinguished name>
objectclass: top
objectclass: organizationalUnit
ou: <organizational unit name>
<list of attributes>
...
```

As an example, the following is an organizational unit entry in the LDIF format.

dn: ou=people, dc=siroe, dc=com objectclass: top objectclass: organizationalUnit ou: people description: fictional organizational unit for example purposes Further, an entry might be of an object class organizationalPerson, indicating that the entry represents a person within a particular organization. This object class might contain a givenname and telephoneNumber attribute for the entry, giving the name and phone number of the person within the organization. As an example, let us consider the object class inetOrgPerson, the schema for which is given below.

TABLE

Attributes of an LDAP-based inetOrgPerson Object

| Attributes | Attribute Description |
|---|---|
| Cn | (Required) Defines the person's common name. |
| Sn | (Required) Defines the person's surname, or last name. |
| BusinessCategory | Identifies the business in which the person is involved. |
| CarLicense | Identifies the person's car license plate number. |
| DepartmentNumber | Identifies the department for which the person works. |
| Description | Provides a text description of the person. |
| employeeNumber | Identifies the person's employee number. |
| EmployeeType | Identifies the person's type of employment (for example, full time). |
| FacsimileTelephoneNumber | Identifies the person's fax number. |
| GivenName | Identifies the person's given, or first, name. |
| HomePhone | Identifies the person's home phone number. |
| HomePostalAddress | Identifies the person's home mailing address. |
| Initials | Identifies the person's initials. |
| JpegPhoto | Contains an image in jpeg format. |
| L | Identifies the location in which the person resides. |
| LabeledURl | Specifies a universal resource locator that is relevant to the person. |
| Mail | Identifies the person's electronic mailing address. |
| Manager | Distinguished name representing the person's manager. |
| Mobile | Identifies the person's mobile phone number. |
| Ou | Identifies the organizational unit to which the person belongs. |
| Pager | Identifies the person's pager number. |
| PhysicalDeliveryOfficeName | Identifies a location where physical deliveries can be made. |
| PostalAddress | Identifies the person's business mailing address. |

TABLE-continued

Attributes of an LDAP-based inetOrgPerson Object

| Attributes | Attribute Description |
|---|---|
| PostalCode | Identifies the person's business postal code(such as a United States zip code). |
| PostOfficeBox | Identifies the person's business post office box. |
| PreferredDeliveryMethod | Identifies the person's preferred method of contact or delivery. |
| RoomNumber | Identifies the room number in which the person is located. |
| Secretary | Identifies the person's secretary or administrator. |
| SeeAlso | URL to information relevant to the person. |
| St | Identifies the state or province in which the person resides. |
| StreetAddress | Identifies a street address at which the person is located. |
| Aci | Identifies access control information for the person's entry. |
| TelephoneNumber | Identifies the person's telephone number. |
| Title | Identifies the person's title. |
| Uid | Identifies the person's user ID. |
| UserPassword | Identifies the password with which the person can bind to the directory. |
| x500UniqueIdentifier | Undefined. |

Directory Server also includes attributes that are read-only and calculated by the server. These attributes are called operational attributes. There are also some operational attributes which can be set by the administrator, for access control and other server functions.

As stated above, entries in a directory are stored in a hierarchical structure in the directory tree. In an LDAP-compliant directory, one can query an entry and request all the entries below it in the directory tree. However, with Directory Server, not all entries will be returned in response to an LDAP request. The directory tree can contain hidden entries that don't appear when clients make requests. These entries are of the object class ldapsubentry. For example, entries used to define roles and CoS are of the ldapsubentry type. To receive these entries, clients need to search specifically for entries of this object class.

Sometimes, the server is requested to search and retrieve entries under a given subtree of the structure. This subtree is called the base distinguished name, or base DN. For example, if one makes an LDAP search request specifying a base DN of ou=people, dc=siroe,dc=com, then the search operation examines only the ou=people subtree in the dc=siroe,dc=com directory tree.

Creating Target Entries

Target entries can use the inetOrgPerson, organizationalPerson, and personobject classes shown in the tables below. The distinguished name entry for a user could be of the form:

cn=full name, ou=organization, . . . ,o=base organization, c=country

For example, if a target entry for Billie Holiday is created within the organizational unit Marketing, and the directory's base DN is o=Ace Industry, c=US, then the person's DN is:

cn=Billie Holiday, ou=Marketing, o=Ace Industry, c=US

It should be noted that this format could be changed to a uid-based distinguished name. The values on the user form fields are stored as the following LDAP attributes:

| User Field | Corresponding LDAP attribute |
|---|---|
| Given Name | givenName |
| Surname | sn |
| Full Name | cn |
| User ID | uid |
| Password | userPassword |
| E-mail Address | email |

Sometimes a user's name can be more accurately represented in characters of a language other than the default language. In such cases, a preferred language for users can be specified so that their names will display in the characters of the that language, even when the default language is English. An example of a record containing textual data about a user can be as follows:

| LDAP field | Comments |
|---|---|
| dn: cn=John Doe,o=SUN,c=US | dn = the distinguished name, the unique key for the record. |
| objectclass: top | objectclass attributes denote the type of record. |
| objectclass: person | |
| objectclass: organizationalPerson | |
| givenname: John | givenname = the user's first name. A user can have multiple givennames. |
| sn: Doe | sn = surname, the user's last name. Typically there is only one per record. |
| cn: John Doe | cn = common name, the name the user is typically known by in the organization. It is traditionally part of the dn, and there is only one per record. |
| uid: jdoe | uid = a user's id, used for authentication purposes. |
| mail: guest@sun.com | A user's e-mail address. There can be multiple per record. |
| Telephone: 202-555-1212 | The user's telephone number. There can be multiple per record. |
| creatorsname: uid=entadmin,o=SUN,c=US | The dn of the user who created this record. |
| createtimestamp: 20000225160825Z | The time when record was created, in GMT. |
| description: This entry was modified with the LWLDAP program by jdoe at Mar. 05, 2000 7:35:22 AM | A note field; can be anything and there can be multiple entries per record. |
| userpassword: {SHA}NWdeaPS1r3uZXZlFrQ/EOELxZFA | The user's password; this example is stored in secure hash algorithm format, but can be stored in clear-text or MD5 hash format. |
| modifytimestamp: 20000313201039Z | The time when record was last modified, in GMT. |
| modifiersname: uid=entadmin,o=SUN,c=US | The dn of the user who modified this record. |
| title: Sales Representative | The title of the user |

Each record can be thought of as an object. User objects can belong to groups of unique members (such as organizational units); groups can in turn belong to other groups.

The dn usually contains at least the user's first and last names (common name, "cn"), the organizational unit ("ou") the user belongs to, and the base field of the user's organization's hierarchy (known as the directory base, consisting of the organization name, "o," and country, "c"). One could also include a user's id or social security number or some other field to help provide uniqueness to a given dn. Here's an example of such a dn:

cn=John Doe+uid=jdoe,ou=ACS,o=SUN, c=US

If no special attributes are specified in the dn like uid or ou, the dn is assumed to be at the top of the hierarchy.

Searching a Directory

Most Directory servers provide a publicly accessible search interface that a client can interact with. The Directory specification allows for boolean, wildcard, and case-insensitive searching. The Directory search syntax currently is obscure and arcane, so it does take some time to get used to. A search can have two steps. As a first step, a hierarchy, called the search base, is specified. An example of a search base is as follows.

Search Base: o=SUN,c=US

All the searches will start from our search base, which in this case is the root of the SUN (Sun Microsystems, Inc.) Directory server hierarchy. As a second step, a search filter is specified. Some examples of filters are as follows.

cn=John Doe
sn=Do*
(&(cn=Jo* Doe)(ou=Accounting))

The first filter will look for a common name ("cn") matching John Doe. The second filter will search the Directory server for all users that have a last name ("sn") with "Do" as the first two letters. It will return Doe, Dogbert, and Doughtery, but not Plado. The third filter, an example of a boolean AND search, will return all users who have a first name that starts with "Jo" and a last name of Doe that are a part of the organizational unit ("ou") Accounting. The boolean Directory server operators are & for AND, | for OR, and ! for NOT. Notice that in an embodiment, the operator is placed first inside a group of parentheses.

The code sample below is a Java programming language method that takes a search base, a user name, and an attribute to search for, and returns an array of any matches it finds.

```java
public synchronized String[ ] getAttrib(String searchBase,
                String username,
                String attribute){        //Returns an array of attributes.
String [] myAttrib=null;
try{                    // Sets up the Directory server filter.
    String MY_FILTER="(l(uid="+username+")(cn="+username+"))";
    // Sets up to pass back only the attribute(s) wanted
    String[] attrNames = {attribute };
    if ( searchBase == null ){
        searchBase = MY_SEARCHBASE;
    }                // Performs the actual search.
LDAPSearchResults res = ld.search(searchBase,
                LDAPv2.SCOPE_SUB,
                MY_FILTER,
                attrNames,
                false);
    /* Loops on results until finished; will only be one! */
    if (res.hasMoreElements( ) ) {
        LDAPEntry findEntry = (LDAPEntry)res.nextElement( );
        /* Gets the attributes of the entry. */
        LDAPAttributeSet findAttrs = findEntry.getAttributeSet( );
        Enumeration enumAttrs = findAttrs.getAttributes( );
        /* Loops on attributes. */
        while (enumAttrs.hasMoreElements( ) ) {
            LDAPAttribute anAttr = (LDAPAttribute)enumAttrs.nextElement( );
            String attrName = anAttr.getName( );
            if (attrName.equals(attribute) ) {
                Enumeration enumVals = anAttr.getStringValues( );
                Vector myVector = new Vector( );
                while (enumVals.hasMoreElements( )){
                    myVector.addElement((String) enumVals.nextElement( ));
                }
                myAttrib = new String[myVector.size( )];
                try{
```

```
            // Will speed up stepping through enumVals.
            for(int i=0;;i++){
                myAttrib[i] = (String)myVector.elementAt(i);
            }
            } catch(ArrayIndexOutOfBoundsException z) {}
        }
    }
    }
}
catch (LDAPException e) {
    switch( e.getLDAPResultCode( ) ) {
        case e.NO_SUCH_OBJECT:
            System.out.println("The specified user does not exist.");
        case e.INVAID_CREDENTIALS:
            System.out.println("Invalid password for user:"+ username);
        default:
            System.out.println(e.toString( ));
    }
}
return myAttrib;
}
```

Creating an LDAP Application

An directory client application generally follows these steps when interacting with a Directory server:

1. initializing a session with a Directory server
2. authenticating itself to the Directory server
3. performing operations
4. closing the connection to the Directory server Initializing a Session with a Directory Server During initialization, as shown in the code below (listing), a number of variables need to be set for the client environment. The default listening port is 389 if SSL is not used, and 636 if SSL is used.

```
                                                    // Set to your Directory server host.
project.host = "directory.phoenixgroup.com";        // Set to Directory Server port.
project.port = 389;                                 // Set to directory base.
project.searchBase = "o=Phoenix Group,c=US"         // Set to the distinguished name.
project.mgr_dn = "cn=SSJS LDAP,ou=Information Services,o=Phoenix Group,c=US" // Set to
the password for the DN.
                    // May be blank for mgr_dn & mgr_pw if directory allows anonymous searches.
project.mgr_pw      = "<MGR DN PASSWORD>" // Grab an LDAP connection.
var ldap            = connect(project.host,
                        parseInt(project.port),
                        project.searchBase,
                        project.mgr_dn,
                        project.mgr_pw);
if (ldap == null){
// Connection could not be made.
    write("Failed to connect to Directory server. See error log or Java Console<br>");}
else{                                   // Store the connection in the project object. */
    project.ldap = ldap;
    redirect("home.htm");
}
```

In start page (login.htm) the following lines of code can be included, witch checks for the existence of "project.ldap" and redirects back to this page if needed.

```
if (project.ldap == void(0)){
redirect('init.htm'); // The redirect at the end of the code is irrelevant when this
    // initial page is called during application or server startup.
}
```

Authenticating the Client to the Directory Server

When a client application establishes a connection with a Directory server, the client application has the option to connect as an authenticated user or anonymously. To perform certain directory operations (such as password checking or changing a record's attribute), the client application must be an authenticated user. In some instances a client is granted extra rights depending on the group of which it is a part.

When a client application authenticates itself to a Directory server database, the Directory server API expects the call to be in the form of a user's dn and password. Users can't be expected to remember their full dn but they can usually provide their user id. Directory server-based authentication usually performs a search to retrieve the user's dn and then make an "authenticate" method call, as shown in the code sample below.

```
var passwd = request.pwd;
var login = authenticate(project.ldap,user,passwd);
debug('<B>'+user+'</B>');
debug('<B>'+passwd+'</B>')
debug('<B>'+login+'</B>');
if (login == true){
        client.user = user; // I'm doing this instead of a redirect.
        write('<FORM NAME="redir" ACTION="attrib.htm" METHOD=POST>');
        write('<INPUT TYPE="hidden" NAME="junk">'); // Need at least one field.
        write('</FORM>');
        }
        else{
    // a redirect is simulated 'cause the values are not desired to be passed on the URL line
        write('<FORM NAME="redir" ACTION="login.htm" METHOD=POST>');
        write('<INPUT TYPE="hidden" NAME="relogin" VALUE="YES">');
        write('<INPUT TYPE="hidden" NAME="badpw" VALUE="YES">');
        write('</FORM>');
}
```

Performing Directory Operations and Disconnecting from the Directory Server

While most data in a Directory server is in a binary format, most of a user's interaction with the Directory server in an intermediate data format called LDAP Data Interchange Format (LDIF). This is an ASCII text representation meant to foster the ability to transfer LDAP data between servers such as an LDAP-compliant Directory server and to manipulate Directory server records with a variety of clients. The code below shows how to change a user's password.

```
user   = client.user;
oldpw  = request.oldpw;
```

-continued

```
newpw  = request.newpw;
newpw2 = request.newpw2;
if (newpw != newpw2){
    redirect("changepw.htm");
}
else{
    var goodpw = authenticate(project.ldap,user,oldpw);
    if (goodpw == true){
        // Change password will also test changeAttrib because
        // changePW is actually a wrapper to that method.
        var didChange = changePW(project.ldap,user,user,newpw);
        if (didChange == true){
            write("Password changed for user: "+user);
            write("<br><a href=\"home.htm\">Login as a different user</a>");
        }
        else{
            write("*ERROR* Password change failed. Check error logs.");}
        }
    else{
        redirect("changepw.htm");
    }
}
```

Although the foregoing description includes some embodiments of the principles of a new and useful system, one skilled in the art will readily appreciate that modifications and rearrangements can be made to those set forth herein without departing from the spirit and scope of the disclosure or without undue experimentation. Accordingly, the following claims should be construed to encompass such modifications and rearrangements.

What is claimed is:

1. A method of configuring a directory server comprising a plurality of entries, comprising:
creating the plurals of entries in the directory server;
creating a CoS scheme,
wherein the CoS scheme comprises a CoS definition entry and a CoS template entry,
wherein the CoS Definition entry has a CoS specifier and a value for the CoS specifier,
wherein the value of the CoS specifier in the CoS definition entry appears in the at least one of the plurality of entries as a first attribute type,
wherein the value of the first attribute type corresponds to a relative distinguishing name (RDN) of the CoS template entry associated with the CoS definition entry, and wherein the CoS template entry comprises at least one attribute value; and configuring CoS logic to use the CoS scheme to provide the attribute value to at least one of the plurality of entries, wherein the at least one of the plurality of target entries is within a scope of a parent of the CoS definition entry, and wherein the directory server supports a Directory Access Protocol (DAP).

2. The method of claim 1, wherein the COS definition entry comprises a list of attribute types, wherein the values associated with the list of attribute types are provided by the COS scheme using the COS template entry.

3. The method of claim 1, wherein the CoS definition entry comprises a CoS specifier and a list of attributes, whereby a first one of the plurality of entries within a scope of a parent of the CoS definition entry obtains values for attributes provided in the CoS definition entry using an attribute with a distinguishing name (DN) value contained within the first one of the plurality of entries.

4. The method of claim 3, wherein the DN points to a second one of a plurality of entries which is a valid entry.

5. The method of claim 3, wherein the DN points to a second one of the plurality of entries which is a valid entry and the first one of the plurality of entries uses the second one of the plurality of entries as a template.

6. An apparatus comprising:
a directory server comprising:
a plurality of target entries;
a CoS scheme,
wherein the CoS scheme comprises a CoS definition entry and a CoS template entry,
wherein the CoS Definition entry has a CoS specifier and a value for the CoS specifier,
wherein the value of the CoS specifier in the CoS definition entry appears in the at least one of the plurality of entries as a first attribute type,
wherein the value of the first attribute type corresponds to a relative distinguishing name (RDN) of the CoS template entry associated with the CoS definition entry, and
wherein the CoS template entry comprises at least one attribute value; and CoS logic configured to use the CoS scheme to provide the attribute value to at least one of the plurality of target entries,
wherein the at least one of the plurality of target entries is within a scope of a parent of the CoS definition entry, and
wherein the directory server supports a Directory Access Protocol (DAPS).

7. The apparatus of claim 6, wherein the CoS definition entry comprises a list of attribute types, wherein values associated with the list of attribute types are provided by the CoS scheme using the CoS template entry.

8. The apparatus of claim 6, wherein the CoS definition entry comprises a CoS specifier and a list of attributes, whereby a first one of the plurality of target entries within a scope of a parent of the CoS definition entry obtains values for attributes provided in the CoS Definition entry using an attribute with a distinguishing name (DN) value contained within the first one of the plurality of target entries.

9. The apparatus of claim 8, wherein the DN points to a second one of the plurality of target entries which is a valid entry.

10. The apparatus of claim 8, wherein the DN points to a second one of the plurality of target entries which is a valid entry and the first one of the plurality of target entries uses the second one of the plurality of target entries as a template.

11. An apparatus comprising:
a directory server comprising:
a first entry;
a plurality of attribute-value pairs, wherein each of the plurality of attribute-values pairs is associated with one of a plurality of CoS template entries, and wherein each of the plurality of CoS template entries are associated with one of a plurality of CoS definition entries;
a component configured to receive a request for one of the plurality of attribute-value pairs associated with the first target entry;
a component configured to search the plurality of attribute-value pairs to obtain the requested one of the plurality of attribute-value pairs associated with the first target entry; and
a component configured to return the requested one of the plurality of attribute-value pairs associated with the first target entry,
wherein the first target entry is within a scope of a parent of the CoS definition entry.

12. The apparatus as in claim 11, wherein the component configured to search the plurality of attribute-value pairs uses a set of constraints to obtain the requested one of the plurality of attribute-value pairs associated with the first target entry, wherein the set of constraints includes the scope.

13. The apparatus of claim 12, wherein the set of constraints comprises determining whether a CoS specifier associated with the requested one of the plurality of attribute-value pairs associated with the first target entry matches a CoS definition entry associated with requested one of the plurality of attribute-value pairs associated with the first target entry.

14. The apparatus of claim 12, wherein the set of constraints comprises determining whether requested one of the plurality of attribute-value pairs associated with the first target entry corresponds to an RDN of a CoS template entry associated with a CoS definition entry.

15. The apparatus of claim 11, wherein the plurality of attribute-value pairs uses an indirect CoS scheme.

16. The apparatus of claim 15, wherein the component configured to search the plurality of attribute-value pairs to obtain the requested one of the plurality of attribute-value pairs associated with the first target entry includes functionality to apply at least one constraint in a set of constraints to obtain the requested on of the plurality of attribute-value pairs.

17. The apparatus in claim 16, wherein applying the set of constraints determining whether a CoS specifier associated with the component configured to search the plurality of attribute-value pairs for the requested one of the plurality of attribute-value pairs associated with the first target entry matches a valid second target entry.

18. The apparatus as in claim 17, wherein the second target entry comprises an attribute provided by the indirect CoS scheme.

* * * * *

UNITED STATES PATENT AND TRADEMARK OFFICE
CERTIFICATE OF CORRECTION

PATENT NO. : 7,020,662 B2
APPLICATION NO. : 09/867595
DATED : March 28, 2006
INVENTOR(S) : David Boreham et al.

It is certified that error appears in the above-identified patent and that said Letters Patent is hereby corrected as shown below:

Claim 6, Column 39, Line 51, replace "(DAPS)" with --(DAP)--.

Claim 11, Column 40, Line 7, insert the word --target-- after "first".

Claim 11, Column 40, Lines8-9, remove the phrase ", wherein each of the plurality of attribute-values pairs".

Claim 13, Column 40, Line 37, insert the word --the-- after "with".

Signed and Sealed this

Twelfth Day of September, 2006

JON W. DUDAS
*Director of the United States Patent and Trademark Office*